United States Patent [19]

Harada

[11] Patent Number: 5,726,770
[45] Date of Patent: Mar. 10, 1998

[54] COPYING MACHINE RESPONSIVE TO PERSONAL IDENTIFICATION DATA

[75] Inventor: Kentaro Harada, Kanagawa-ken, Japan

[73] Assignee: Kabushiki Kaisha Toshiba, Kawasaki, Japan

[21] Appl. No.: 307,012

[22] Filed: Sep. 16, 1994

[30] Foreign Application Priority Data

Sep. 22, 1993 [JP] Japan .................... 5-259226

[51] Int. Cl.$^6$ .................................. H04N 1/21
[52] U.S. Cl. .................. 358/444; 358/404; 358/403; 358/401; 395/115
[58] Field of Search .................. 358/401–404, 358/440, 444, 296; 355/201; 395/115; 399/1

[56] References Cited

U.S. PATENT DOCUMENTS

| | | | |
|---|---|---|---|
| 4,646,160 | 2/1987 | Iizuka et al. | 358/257 |
| 5,097,341 | 3/1992 | Forest | 358/296 |
| 5,099,340 | 3/1992 | Kamada et al. | 358/402 |
| 5,107,339 | 4/1992 | Bertoni et al. | 358/296 |
| 5,224,156 | 6/1993 | Fuller et al. | 358/440 |
| 5,245,368 | 9/1993 | Farrell et al. | 358/401 |
| 5,351,136 | 9/1994 | Wu et al. | 358/440 |
| 5,384,632 | 1/1995 | Nakajima et al. | 355/313 |
| 5,448,375 | 9/1995 | Cooper et al. | 358/401 |
| 5,596,640 | 1/1997 | Ohta | 358/430 |

*Primary Examiner*—Peter S. Wong
*Assistant Examiner*—Derek J. Jardieu
*Attorney, Agent, or Firm*—Foley & Lardner

[57] ABSTRACT

An image-forming apparatus for forming an image on an image-bearing member includes an image-reading unit. The image-reading unit has an electric component which converts an original image to image data. The image-forming apparatus has a data memory in which the image data is stored, and an image-forming unit. The image-forming unit has an electric component which forms an image on the image-bearing member on the basis of the image data and a personal identification code. Furthermore, the image-forming apparatus has a control unit for controlling the image-forming unit so as to form an image on the basis of the image data at a predetermined timing which an operator requests.

30 Claims, 24 Drawing Sheets

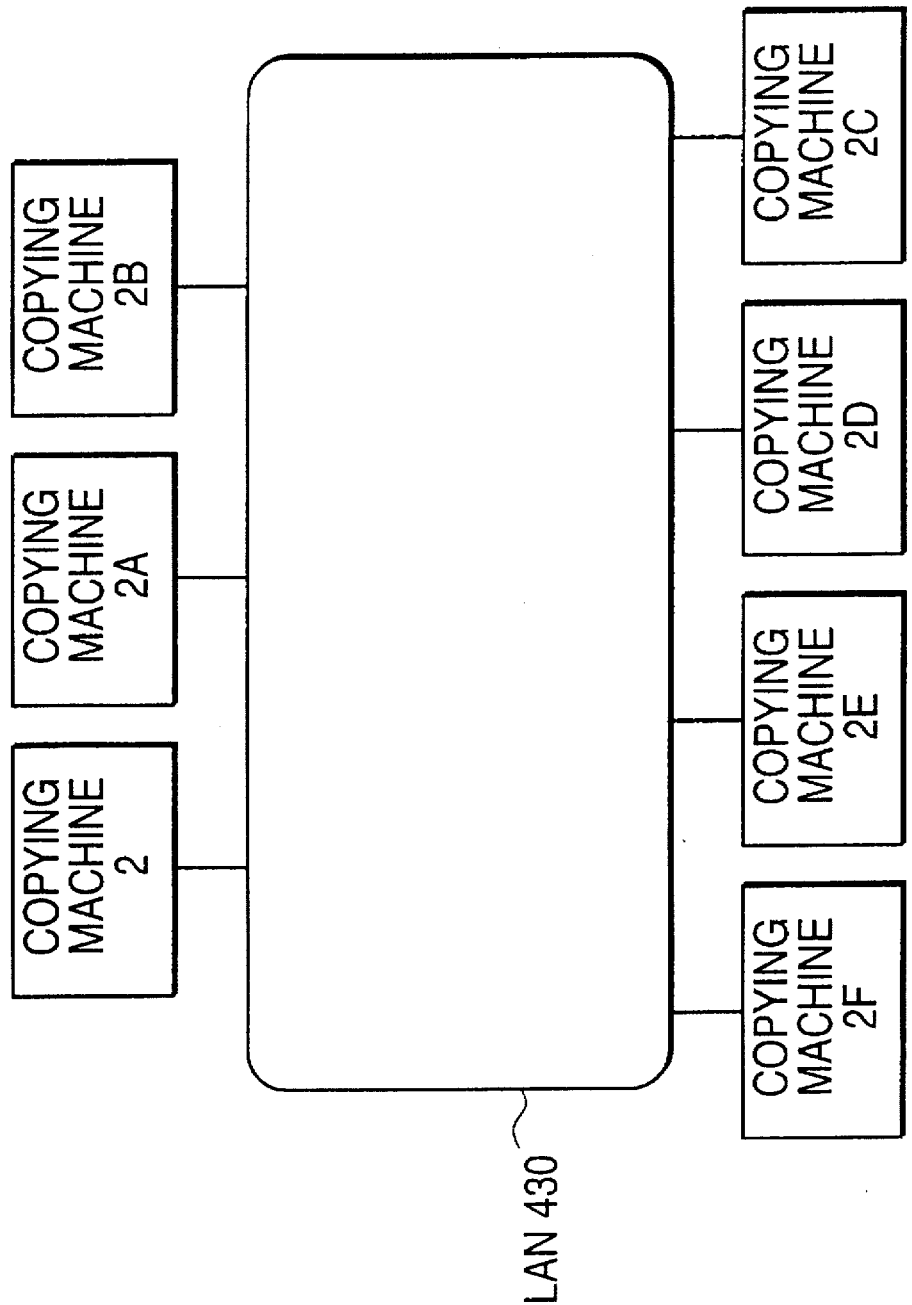

FIG. 10

| OUTPUT TIME | IMAGE DATA | COPYING CONDITION |
|---|---|---|
| T(1) | I(1) | C(1) |
| T(2) | I(2) | C(2) |
| T(3) | I(3) | C(3) |
| · · · · | · · · · | · · · · |
| T(m) | I(m) | C(m) |

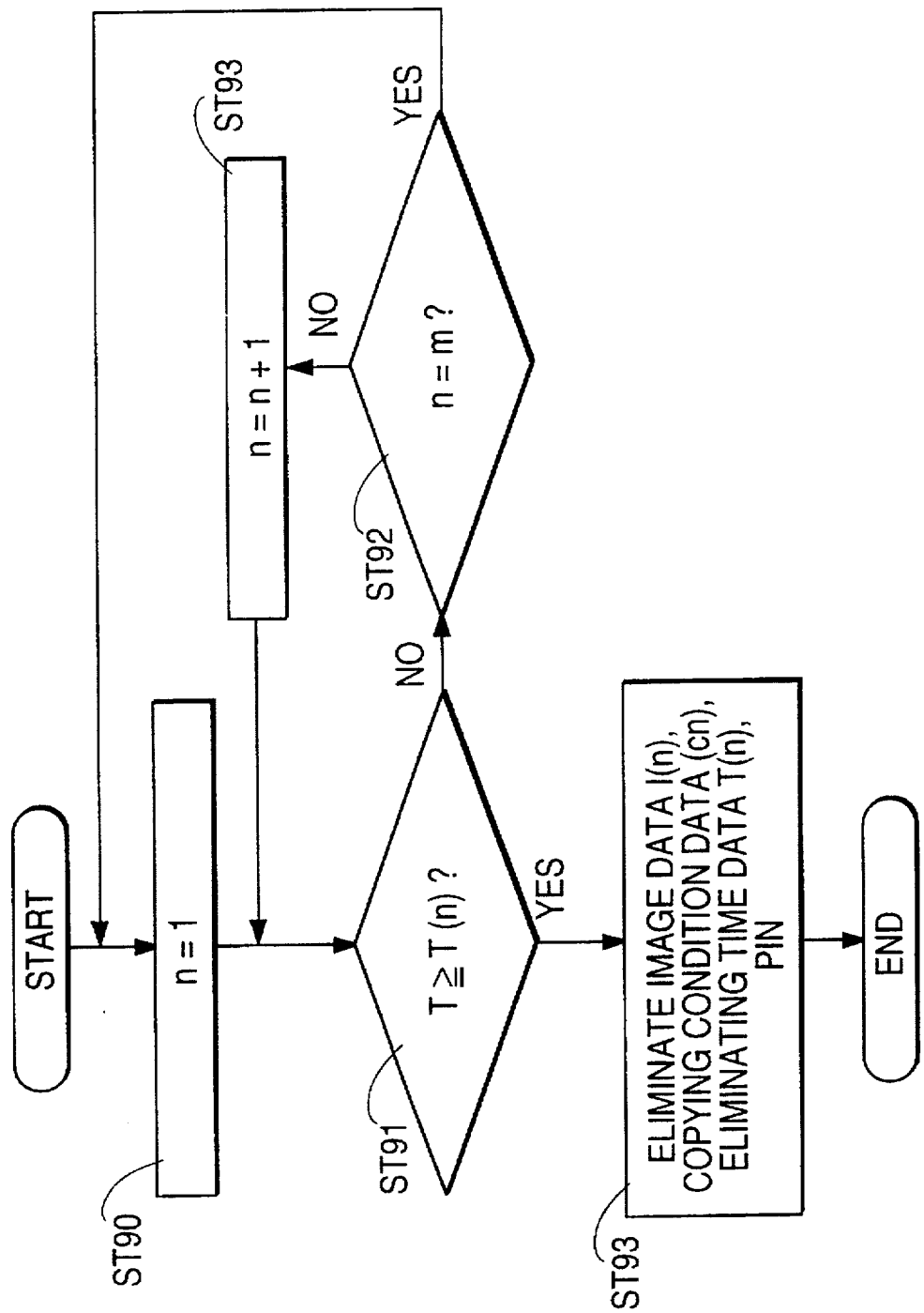

5,726,770

COPYING MACHINE RESPONSIVE TO PERSONAL IDENTIFICATION DATA

BACKGROUND OF THE INVENTION

1. Field of the Invention

The present invention relates to an image-forming apparatus having an image-reading device and an image-forming device which is independent from the image-reading device, for forming an image on an image-bearing member based on image-data formed by the image-reading device.

2. Description of the Related Art

Recently, image-forming devices, e.g., plain paper copying machines, have been known to have a facsimile function, and/or a printing function besides a copying function. When the image is formed in the facsimile function or the printing function by this type of image-forming device, an operator is generally not near the image-forming device. Therefore, even if an operator is not at the image-forming device for operating same, the image-forming device may not necessarily to be usable. In this case, it is not a good idea for an operator who wants to make a copy to wait until the image-forming device is usable. Because it is very difficult for the operator to predict the time at which the image-forming device is usable, the operator must waste time waiting around, or return several times with the originals in hand hoping that the image-forming device is free.

As one method which resolves this problem, a reservation mode is disclosed in, for example, Japanese Patent Publication (Kokai) No. 4-14947. When the image-forming device is set in the reservation mode, the image-forming device automatically makes a copy when the image-forming device becomes usable.

However, if originals are confidential documents, it is not good to use the reservation mode, because the originals as well as the copies are left unattended in the machine, and it may be possible for a third person to see them.

SUMMARY OF THE INVENTION

It is therefore an object of the present invention to provide an improved image-forming apparatus.

It is a particular object of the present invention to provide an image-forming apparatus with a more useful reservation function in which confidential documents are prevented from being seen by a third person.

Another object of the present invention is to provide an improved image-forming method.

It is another object of the present invention to provide an improved image-forming system.

In accordance with one aspect of the present invention, the foregoing objects, among others, are achieved by providing an image-forming apparatus for forming an image on an image-bearing member. The image forming apparatus has an image-reading unit. The image-reading unit has an electric component which converts an original image to an image data. The image-forming apparatus also has a data memory in which the image data is stored, and an image-forming unit. The image-forming unit has an electric component which forms an image on the image-bearing member on the basis of the image data. Furthermore, the image-forming apparatus has a data input device. The data input device has an electric component which makes an identification data in accordance with an operation of an operator. The image-forming apparatus has a unit for controlling the data memory so that a correspondence is found between the image data and the identification data, and controlling the image-forming unit so as to form an image on the basis of the image data corresponding to the identification data when the same identification data is provided again.

In accordance with another aspect of the present invention, there has been provided an image-forming apparatus for forming an image on an image-bearing member. The image-forming apparatus has an image-reading unit. The image-reading unit has an electric component which converts an original image to an image data. The image-forming apparatus also has a data memory in which the image data is stored, and an image-forming unit. The image-forming unit having an electric component which forms an image on the image-bearing member on the basis of the image data. Furthermore, the image-forming apparatus has a data input device. The data input device having an electric component which generates output time data in accordance with an operation of an operator. The image-forming apparatus has a unit for controlling the data memory so that a correspondence is found between the image data and the output time data, and controlling image-forming unit so as to form an image on the basis of the image and at a time equal to or greater than the output time data.

In accordance with another aspect of the present invention, there has been provided an image-forming system. The image-forming system has a first apparatus, a second apparatus, and a communications line for coupling the first apparatus to the second apparatus. The first apparatus has an image-reading unit. The image-reading unit has an electric component which converts an original image to an image data. The first apparatus also has a data memory in which the image data is stored, and a first data input device. The first data input device having an electric component which makes an identification data in accordance with an operation of an operator. Furthermore, the first apparatus has a first control unit for controlling the data memory so that a correspondence is found between the image data and the identification data. The second apparatus has an image-forming unit. The image-forming unit has an electric component which forms an image on the image-bearing member on the basis of an image data. The second apparatus also has a second data input device. The second data input device has an electric component which makes an identification data in accordance with an operation of an operator. Furthermore, the second apparatus has a second control unit for controlling the image-forming unit so as to form an image on the basis of the image data stored in the data memory of the first apparatus, corresponding to the identification data when the same identification data is provided.

In accordance with another aspect of the present invention, there has been provided an image-forming apparatus for forming an image on an image-bearing member. The image-forming apparatus has an image-reader for reading an original image to make an image data, a memory for storing the image data in correspondence with an identification data, an image-forming unit for forming an image on the image-bearing member on the basis of the image data, and a driver for driving the image-reader and the image-forming unit so as to be independent of each other. The image-forming apparatus also has a first setting device for setting an image input mode when the image-reader is usable, a second setting device for setting an image output mode when the image-forming unit is usable, an input unit for inputting an identification data, and a control unit for controlling the memory so that a correspondence is found between the image data and the identification data when the image reader operates in the image input mode, and controlling the image-forming unit so as to form an image on the basis of the image data corresponding to the identification data when the identification data is inputted in the image output mode.

In accordance with another aspect of the present invention, there has been provided an image-forming method for forming an image on an image-bearing member. The image-forming method has the steps of, reading an original image to convert an image data, inputting an identification data corresponding to the image data, storing the image data and the identification data so that a correspondence is found between the image data and the identification data; and forming an image on the image-bearing member on the basis of the image data corresponding to the identification data when the same identification data is inputted again.

In accordance with another aspect of the present invention, there has been provided an image-forming method for forming an image on an image-bearing member. The image-forming method has the steps of, reading an original image to convert an image data, inputting an output time data corresponding to the image data, storing the image data and the identification data so that a correspondence is found between the image data and the identification data; and forming an image on the image-bearing member on the basis of the image data corresponding to the output time data when a time which the output time data indicates has come.

In accordance with another aspect of the present invention, there has been provided an image-forming apparatus for forming an image on an image-bearing member. The image-forming apparatus has an image-reading unit. The image-reading unit has an electric component which converts an original image to an image data. The image-forming apparatus has a data memory in which the image data is stored, and an image-forming unit. The image-forming unit has an electric component which forms an image on the image-bearing member on the basis of the image data. Furthermore, the image-forming apparatus has a control unit for controlling the image-forming unit so as to form an image on the basis of the image data at a predetermined timing which an operator requests.

In accordance with another aspect of the present invention, there has been provided a method of enhancing efficiency of operation of an image-forming apparatus having an image-scanning unit and an image-forming unit. The method has the step of, when the image-forming unit is busy, scanning an original document with the image-scanning unit to produce image data, entering identification data, and storing the image data in correspondence with the identification data. The method also has the step of, when the image-forming unit is not busy, entering the identification data again, retrieving the stored image data corresponding to the entered identification data, and operating the image-forming unit to produce a copy of the original document.

In accordance with another aspect of the present invention, there has been provided a method of enhancing efficiency of operation of an image-forming apparatus having an image-scanning unit and an image-forming unit. The method has the step of, when the image-forming unit is busy, scanning an original document with the image-scanning unit to produce image data, entering time data, and storing the image data in correspondence with the time data. The method also has the step of, when the image-forming unit is not busy, retrieving the stored image data corresponding to the entered time data when the actual time is equal to or greater than the entered time, and operating the image-forming unit to produce a copy of the original document.

In accordance with still another aspect of the present invention, there has been provided an image-forming apparatus for forming an image on an image-bearing member. The image-forming apparatus has an optical image-scanning device generating image data corresponding to an original document, an input device for inputting identification data, a memory for storing the image data in correspondence with the identification data, and an image-forming unit for forming an image on the image-bearing member in accordance with the image data and in response to a second inputting of the identification data.

BRIEF DESCRIPTION OF THE DRAWINGS

A more complete appreciation of the present invention and many of the attendant advantages thereof will be readily obtained as the invention becomes better understood by reference to the following detailed description, when considered in connection with the accompanying drawings, wherein:

FIG. 7 is a diagram showing an image-forming system including the image-forming apparatus;

FIG. 10 is a table schematically showing a storing condition of an output time data, an image data and a copying condition data of the second embodiment;

FIG. 13 is a flow chart for illustrating the operation of the fourth embodiment of the control system shown in FIGS. 4(a) to 4(c);

DETAILED DESCRIPTION OF THE PREFERRED EMBODIMENTS

Figure 1:
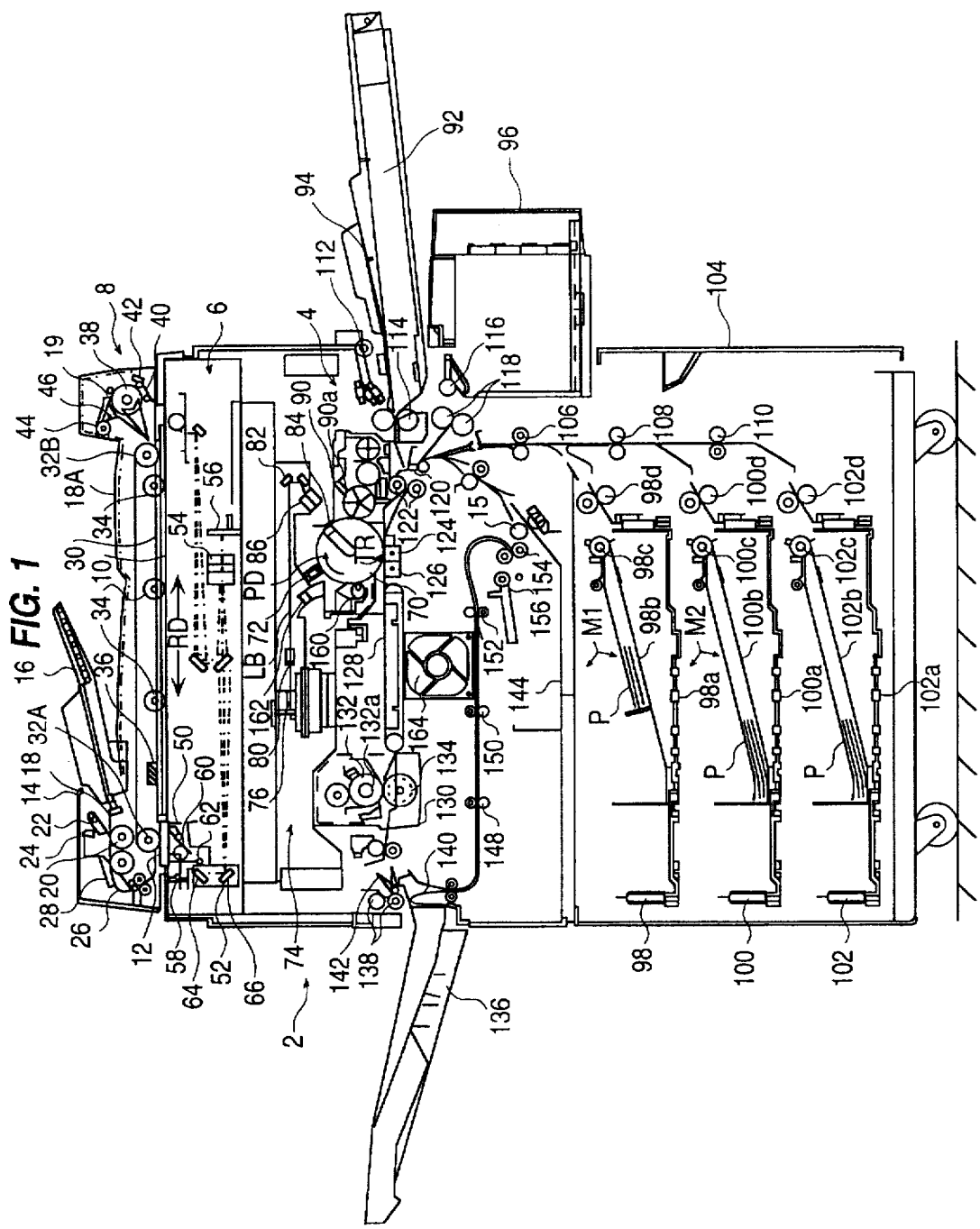
FIG. 1 is a sectional view of the image-forming apparatus of a first embodiment of the present invention.

FIG. 1 shows a copying machine 2 as an image-forming apparatus according to an embodiment of the present invention. Copying machine 2 has three functions which are a copying function, a facsimile function, and a printing function.

Copying machine 2 includes an image-forming portion 4 at the central portion thereof. An image-scanning portion 6 is arranged at the upper portion of image-forming portion 4. Furthermore, an automatic-document feeder 8 is arranged at the top of copying machine 2.

A platen 10, which is a transparent glass, is fixed on the upper surface of image-scanning portion 6. Automatic-document feeder 8 is arranged to removably cover platen 10. A scale 12 is used for positioning an original D fixed at one end of platen 10 along the longitudinal direction thereof.

Automatic-document feeder 8, including a housing 14 and a tray 16 and feeds document D placed on tray 16 onto platen 10 through a document-transport pass 18. After original D has been scanned by image-scanning portion 6, automatic-document feeder 8 discharges original D to a discharge portion 18A on housing 14 through a document-discharging pass 19. A pick-up roller 20, a plate 22 facing pick-up roller 20, a document-detecting sensor 24, a document-transport roller 26, and a friction plate 28 are arranged along document-transport pass 18 in the document-transport direction. Pick-up roller 20 picks up original D placed on tray 16. At that time, plate 22 presses original D toward pick-up roller 20 so as to make the picking-up operation easy. Document-transport roller 26 feeds original D one by one downstream, because friction plate 28 prevents document-transport roller 26 from transporting a plurality of originals at the same time. These mechanisms work only when document-detecting sensor 24 detects that original D is on tray 16.

A document-conveying belt 30 is stretched by belt rollers 32A and 32B to cover platen 10 on the bottom of automatic-document feeder 8. Document-conveying belt 30 is a white wide endless belt and is driven in the forward and reverse directions by a belt driving mechanism (not shown). A plurality of belt-retaining rollers 34 and a set switch 36 are arranged at the back side of the inner circumference of document-conveying belt 30. Belt-retaining rollers 34 press document-conveying belt 30 against platen 10 to transport original D between document-conveying belt 30 and platen 10. Set switch 36 detects the open/close state of automatic-document feeder 8. Original D transported by document-transport roller 26 is positioned at a scanned position on platen 10 by document-conveying belt 30.

A document-transport roller 38, a pinching roller 40, a document-detecting sensor 42, and a discharging roller 44 are arranged along document-discharging pass 19 in the document-transport direction. Document transport roller 38 transports original D which is transported by document-conveying belt 30 while pinching roller 40 presses original D against document-transporting roller 38. Document-detecting sensor 42 detects the trailing edge of original D to detect an abnormal condition in relation to the original transportation. Discharging roller 44 discharges original D onto discharge portion 18A.

Furthermore, a gate 46 is arranged between document-transporting roller 38 and discharging roller 44. Gate 46 guides original D to platen 10 so that the back surface of original D faces platen 10. In this case, document-conveying belt 30 is driven in the reverse direction.

Original D placed on platen 10 is scanned for image exposure by image/scanning portion 6. Image-scanning portion 6 includes a first carriage 50, a second carriage 52 and a lens block 54 for focusing the light from original D onto a CCD sensor 56. First carriage 50 includes an exposure lamp 58, a reflector 60 for reflecting the light from exposure lamp 58 to platen 10, and a mirror 62. Second carriage 52 includes a mirror and a mirror 66. First carriage 50 and second carriage 52 are moved by a pulse motor (not shown), through a driving belt and some gears (not shown). Therefore, when image-scanning position 6 scans original D, original D is exposed by exposure lamp 58 while first carriage 50 and second carriage 52 reciprocate in the direction indicated by an arrow RD along the under surface of platen 10. In this case, second carriage 52 moves at a speed half that of first carriage 50 in order to maintain a fixed optical path length.

A reflected light beam from original D scanned by image-scanning portion 6 is reflected by mirror 62, mirror 64 and mirror 66, transmitted through lens block 54 and then directed to CCD sensor 56. CCD sensor 56 outputs electric signals corresponding to the reflected light beam indicating the original image of original D. In this embodiment, one pixel of original D corresponds to one element of CCD sensor 56.

Image-forming portion 4 forms an image corresponding to signals output by CCD sensor 56 or provided by an external device. Image-forming portion 4 includes a photosensitive drum 70. Photosensitive drum 70 is rotated by a motor (not shown) in the direction indicated by an arrow PD so that its surface is wholly charged first by a main charger 72 so that a potential of the circumferential surface is about −750 V. A laser beam LB is projected on the charged surface of photosensitive drum 70 by a laser unit 74, forming the electrostatic latent image. Laser unit 74 includes semiconductor laser oscillator (not shown) for generating laser beam LB modulated in accordance with dot image data on the basis of the signal output from CCD sensor 56 or the external device. Also, laser unit 74 includes a collimator lens (not shown) for focusing laser beam LB emitted from the laser oscillator so that a cross-sectional shape of the laser beam LB is circular, a polygon mirror 76 for scanning laser beam LB focused by the collimator lens, and a mirror motor 78 for rotating polygon mirror 76 at a high speed. Furthermore, laser unit 74 includes a first FO lens 80 to unify the focusing of the laser beam LB from polygon mirror 76 in the scanning direction, a mirror 82 and a mirror 84 for reflecting laser beam LB, and a second FO lens 86 to unify the focusing of the laser beam LB.

The electrostatic latent image is developed into a visible image which is a toner image by a developing roller 90a of a developing unit 90 using two component developing agents. A bias voltage of the developing unit 90 is about −500 V. Paper sheet P as an image record media are delivered one by one from a paper cassette 92, a paper tray 94 located on paper cassette 92, a large-capacity feeder 96, a paper cassette 98, a paper cassette 100, and a paper cassette 102. Paper cassette 98, paper cassette 100, and paper cassette 102 are removably arranged in a pedestal 104 for copying machine 2. Paper cassette 98, paper cassette 100, and paper cassette 102 have a cassette case 98a and a movable plate 98b, a cassette case 100a and a movable plate 100b, and a cassette case 102a and a movable plate 102b, respectively. Paper sheet P is placed on movable plate 98b, movable plate 100b, and movable plate 102b. Each of movable plates 98b, 100b, and 102b is moved in the direction indicated by an arrow M1, an arrow M2, and an arrow M3, respectively. Before paper sheet P is picked up, movable plates 98b, 100b, and 102b are moved upward. Paper sheet P in paper cassettes 98, 100, and 102 are picked up by pick-up rollers 98c, 100c, and 102c, respectively, and transported a transport roller pairs 98d, 100d, and 102d, respectively. After that, paper sheet P is transported by transport roller pairs 106, 108, and/or 110.

On the other hand, paper sheet P in paper cassette 92 and paper tray 94 is picked up by a pick-up roller 112, and transported by a transport roller pair 114. Paper sheet P in large-capacity feeder 96 is picked up by a pick-up roller 116, and transported by a transport roller pair 118. Each of transport roller pairs 98d, 100d, 102d, 114, and 118 is a conventional paper separating mechanism for transporting paper sheet P one by one and constructed by a transport roller and a separation roller.

Paper sheet P delivered from paper cassette 92, paper tray 94, large-capacity feeder 96, paper cassette 98, paper cassette 100, or paper cassette 102 is detected by an aligning switch 120 just upstream of aligning roller pair 122 in the transportation direction of paper sheet P. Then, each paper sheet P is delivered to a transfer region TR by aligning roller pair 122, timed to the formation of the visible image on drum 170.

Paper cassette 92, paper tray 94, large-capacity feeder 96, paper cassette 98, 100, and 102 can be alternatively selected by the operator using a control panel described later.

Paper sheet P delivered to transfer region TR comes into intimate contact with the surface of photosensitive drum 70, in the space between a transfer charger 124 which is a DC corona discharger and photosensitive drum 70. As a result, the toner image on photosensitive drum 70 is transferred to paper sheet P by the agency of transfer charger 124. After the transfer, paper sheet P is separated from photosensitive drum 70 by a separation charger 126 which is a vibratory (AC+ DC) corona discharger and transported by a conveyor belt 128. Separation charger 126 removes the electrostatic force supplied between photosensitive drum 70 and paper sheet P in order to separate the paper sheet from photosensitive drum 70. Thereafter, paper sheet P is delivered to a fixing unit 130 arranged at the terminal end portion of conveyor belt 128 along a paper path. Fixing unit 130 includes a heat roller 132 which has a heater lamp 132a and a pressure roller 134 which is arranged in contact with heat roller 132. As paper sheet P passes a nip portion between heat roller 132 and pressure 134, the transferred image is fixed on paper sheet P. After the fixation, paper sheet P is discharged into a tray 136 outside a housing by exit roller pair 138.

If paper sheet P, however, is to have a two-sided copying or a multiple copying, paper sheet P is sent, instead of being discharged directly to tray 136 through exit roller pair 138, into a retransporting path 140 by means of a gate unit 142. Gate unit 142 is arranged between fixing unit 130 and exit roller pair 138. Gate unit 142 guides paper sheet P for a paper tray 144, and paper-transport roller pairs 146, 148, 150, 152, and 154 transport paper sheet P to paper tray 144. After that, paper sheet P transported to paper tray 144 is picked up by a pick-up roller 156, and transported to aligning roller pair 122 by a paper-transport roller pair 158. In this way, paper sheet P is transported to the transfer region again, and, the two-sided copying is performed.

After the transfer, moreover, the residual toner on the surface of photosensitive drum 70 is removed by a cleaner 160. Thereafter, a residual latent image on photosensitive drum 70 is erased by a discharge lamp 162 to restore the initial state. A cooling fan 164 for preventing the temperature outside the housing from rising is arranged at a lower, right portion of fixing unit 130.

Figure 2A:
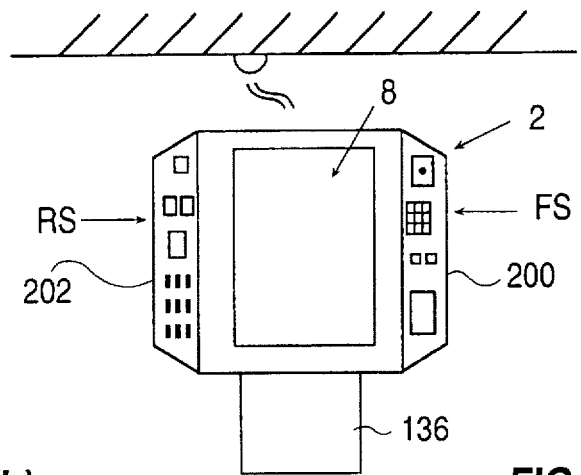
FIGS. 2(a) to 2(f) are perspective views schematically showing a construction of an automatic-document feeder and control panels.
Figure 2B:
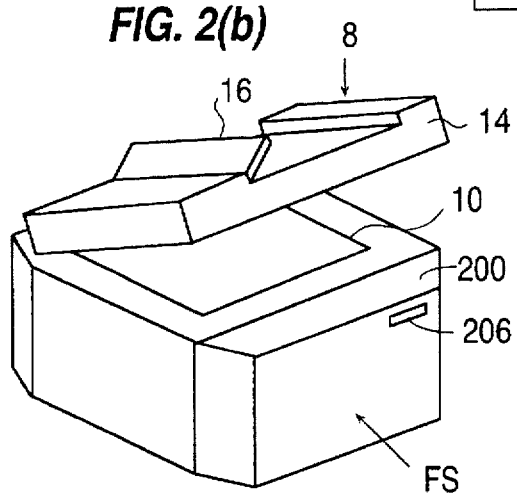
Figure 2C:
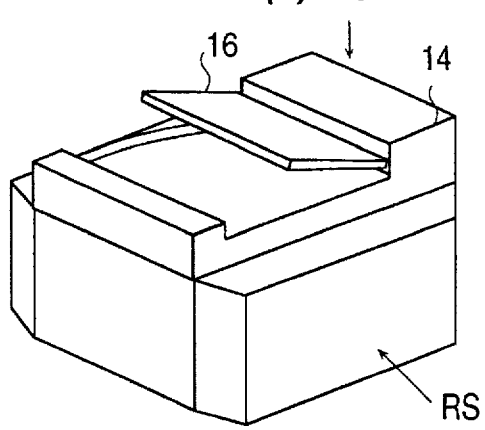
Figure 2D:
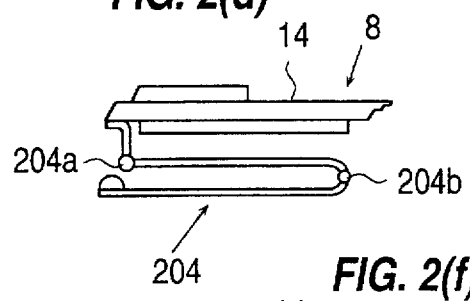
Figure 2E:
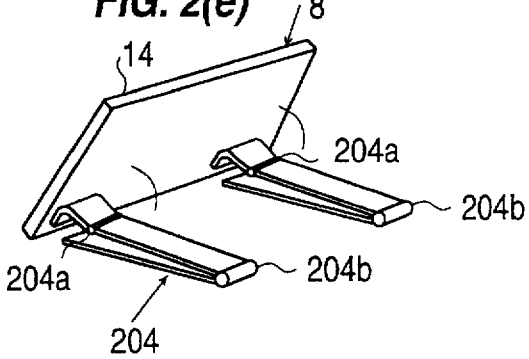
Figure 2F:
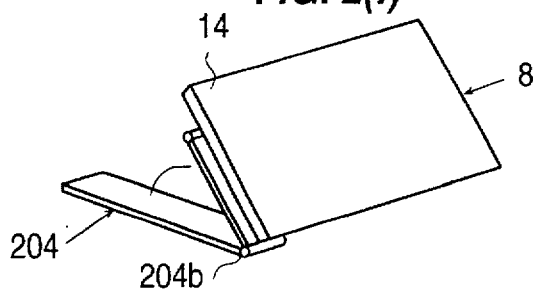

As shown in FIG. 2(a), a control panel 200 and a control panel 202 are mounted on the housing of copying machine 2. Control panel 200 is used for setting some copying conditions, and control panel 202 is used for setting facsimile communications. When the copying function is used, an operator faces a front side indicated by arrow FS as shown in FIGS. 2(a) and 2(b), and operates automatic-document feeder 8 and control panel 200. On the other hand, when the facsimile function is used, an operator faces a rear side indicated by arrow RS as shown in FIGS. 2(a) and 2(c), and operates automatic-document feeder 8 and control panel 202. It is easy for an operator to put original D on tray 16 arranged on the top of copying machine 2. Furthermore, mechanism 204 is provided between automatic-document feeder 8 and the housing of copying machine 2. Hinge mechanism 204 includes a first rotational portion 204a and a second rotational portion 204b. When automatic-document feeder 8 is opened in the front side, first rotational portion 204a rotates (see FIG. 2(e)). On the contrary, when automatic-document feeder 8 is opened in the rear side, second rotational portion 204b rotates (see FIG. 2(f)). Thus, automatic-document feeder 8 can be opened from both the front side and the rear side. An ID card slot 206 is formed at the front side and at a lower portion of control panel 200. When an ID card is inserted into ID card slot 206, copying machine 2 identifies an operator.

Figure 3:
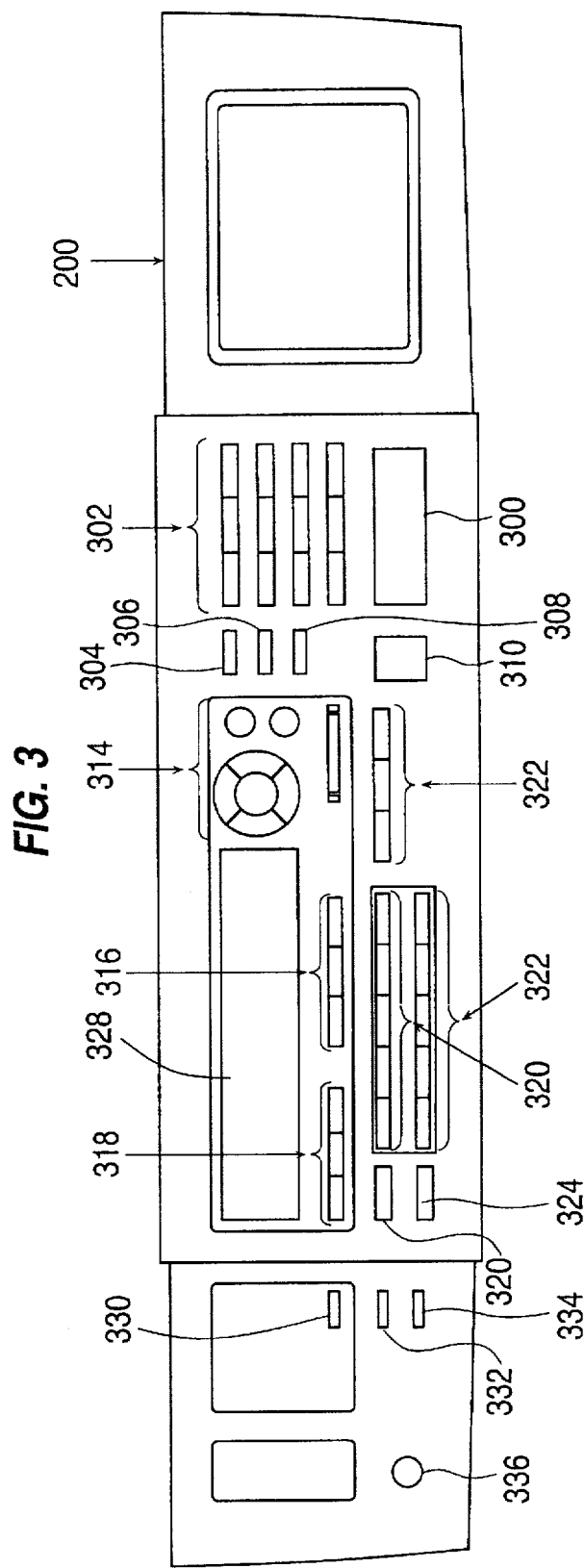
FIG. 3 is a plan view of the control panel of the image-forming apparatus.

Control panel 200 will now be described. As shown in FIG. 3, control panel 200 carries thereon a copy key 300 for starting the copying operation, keys 302 for setting the number of copies to be made and the like, a function clear key 304 for setting the standard status, an energy saver key 306 for going into the energy-saving mode and turning all its display lamps off, an interrupt key 308 for making a copy of a different original during a multicopy run, and a clear/stop key 310 for clearing the copy quantity entered or stopping a multicopy run.

Control panel 200 is further provided with a density setting section 312 for setting the copy density, an editing key 314 for setting the trimming mode or masking mode and modifying characters, operation guide keys (YES key, NO key, and HELP key) 316 for asking the appropriate operation procedure and answering the questions from copying machine 2, and zoom keys 318 for adjustably setting the enlargement or reduction ratio. In this embodiment, even if a predetermined enlargement or reduction ratio is set by zoom keys 318, lens block 54 in image-scanning portion 6 do not move. For changing the magnification between an original image and a copy image, an image data based on the signal output from CCD sensor 56 is changed by software.

Additionally arranged on control panel 200 are an original size key 320 for setting an original size, a copy size key 322 for selecting the paper sheet size, an automatic paper selection key 324 for automatically detecting the size of the original set on platen 10 and selecting a paper sheet of the same size as the original, an automatic-magnification selection key 326 for automatically detecting the size of the original D set on platen 10 and calculating the correct enlargement or reproduction ratio, and a display section 328 for indicating the operating conditions of the individual parts. Display section 328 is constructed from a liquid crystal. Furthermore, control panel 200 is provided with a cassette selection key 330 for alternatively selecting paper cassettes 92, 98, 100, and 102, large-capacity feeder 96, and paper tray 94; an image input key 332; an image output key 334; and a LED display 336. When image input key 332 is depressed once, copying machine 2 is set in an image input mode from a normal mode. If image input key 332 is depressed again, copying machine 2 is returned to the normal mode. When image output key 334 is depressed once, copying machine 2 is set in an image output mode from the normal mode. If image output key 334 is depressed again, copying machine 2 is returned to the normal mode.

The image input mode and the image output mode will be described later. LED display 336 turns on when copying machine 2 is performing the operation in either the facsimile function or the printing function. Thus, an operator can know if it is possible for the operator to set copying machine 2 in the copying function, by seeing LED display 336.

A control system of copying machine 2 is described in detail below.

Figure 4A:
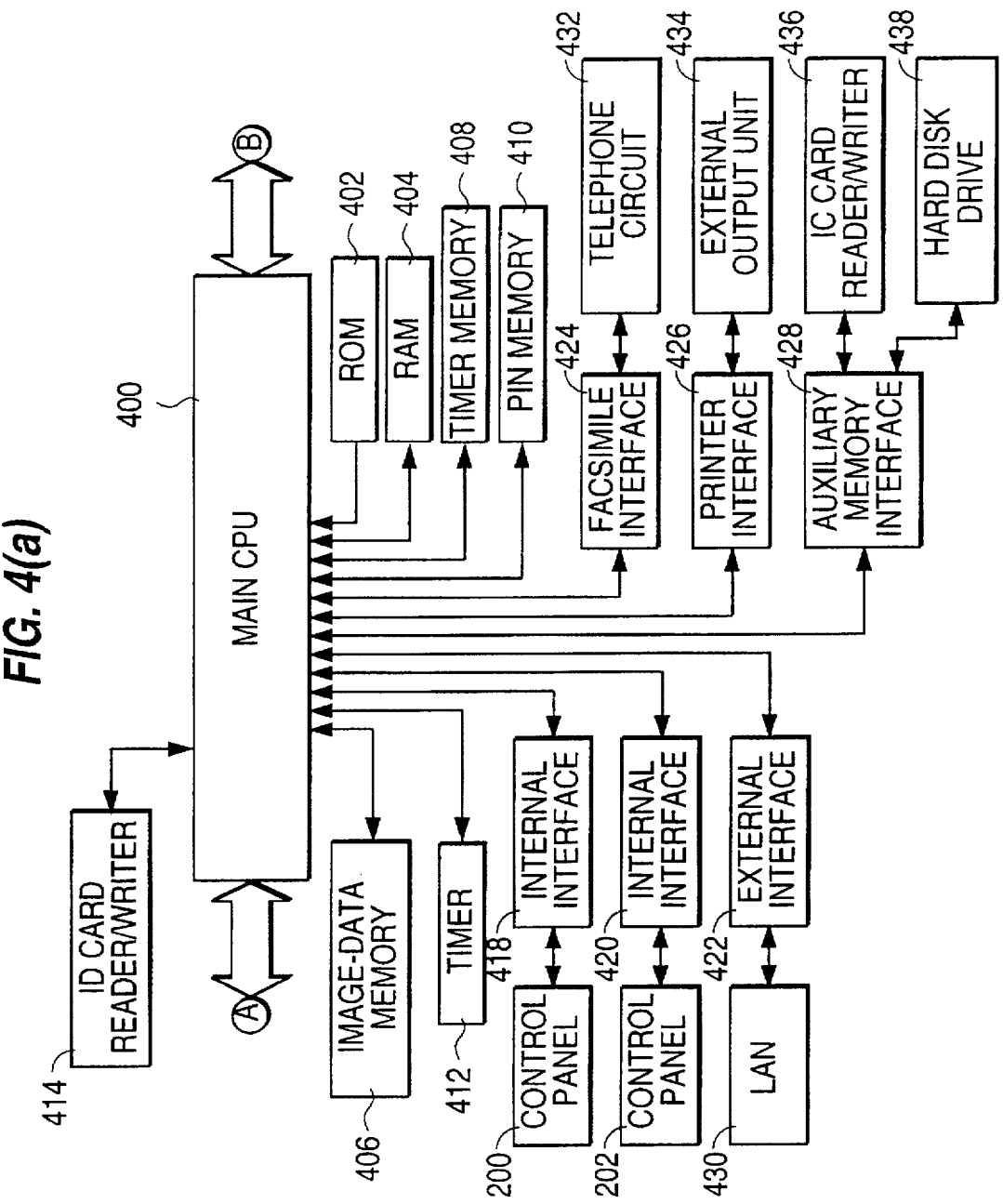
FIGS. 4(a) to 4(c) are diagrams showing a control system of the image-forming apparatus shown in FIG. 1.

As shown in FIG. 4(a), the control system has a main CPU 400 which controls the control system. A ROM 402 stores a control program. CPU 400 operates in accordance with the control program. A RAM 404 is used as a work buffer of CPU 400. An image-data memory 406 is used as a page buffer for temporarily storing image data from an external device or image-scanning portion 6. If copying machine 2 is set to make a plurality of copies from one original by an operator, then image-scanning portion 6 performs the image-scanning operation once and stores the image data to image-data memory 406. Next, image-forming portion 4 makes a required number of copies by using the image data stored in image-data memory 406. Also, copying machine 2 may perform a so-called electric sorting operation because copying machine 2 has image-data memory 406. The electric sorting operation means the sorting operation which does not sort paper sheets P mechanically, but changes the order of the image-forming operation electronically to print documents stored in memory in a fashion desired by the operator. A timer memory 408 stores an input time data input by control panel 200 and an operated time data which represents a time at which an operator operates copying machine 2 in the image input mode. A PIN memory 410 stores a personal identification number by which an operator is identified. A timer connects main CPU 400 to output a predetermined signal corresponding to elapsed time which has been set. An ID card reader/writer 414 reads data from an ID card which is inserted into ID card slot 206, and writes data to the ID card.

Furthermore, main CPU 400 connects to an internal interface 418, an internal interface 420, an external interface 422, a facsimile interface 424, a printer interface 426, and an auxiliary memory interface 428. Internal interface 418 exchanges signals between main CPU 400 and control panel 200. Internal interface 420 exchanges signals between main CPU 400 and control panel 202. External interface 422 exchange image data between main CPU 400 and a LAN 430. Facsimile interface 424 exchanges image data between main CPU 400 and a telephone circuit 432. Printer interface 426 exchanges image data between main CPU 400 and an external output unit 436, e.g., a computer or a word processor. Auxiliary memory interface 428 exchanges image data between main CPU 400 and an ID card reader/writer 436 and/or a hard-disc drive 438.

Figure 4B:
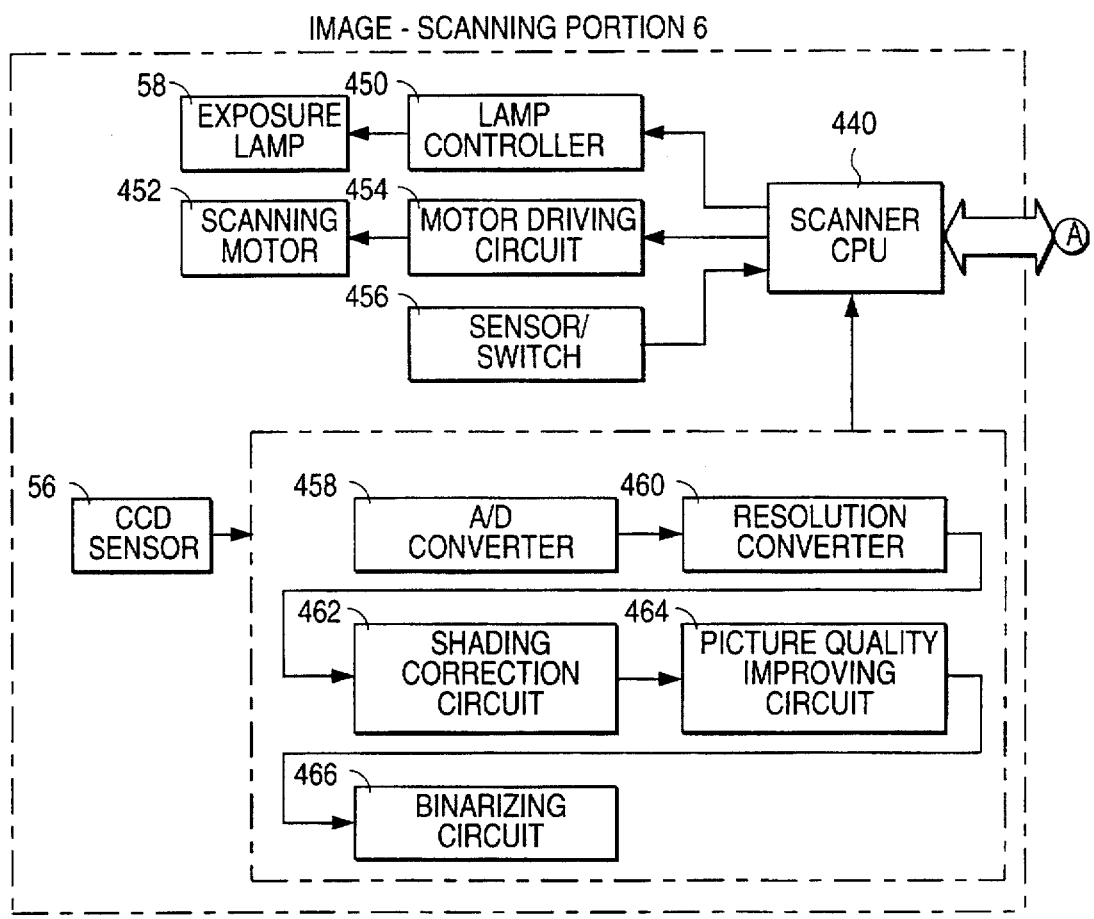
Figure 4C:
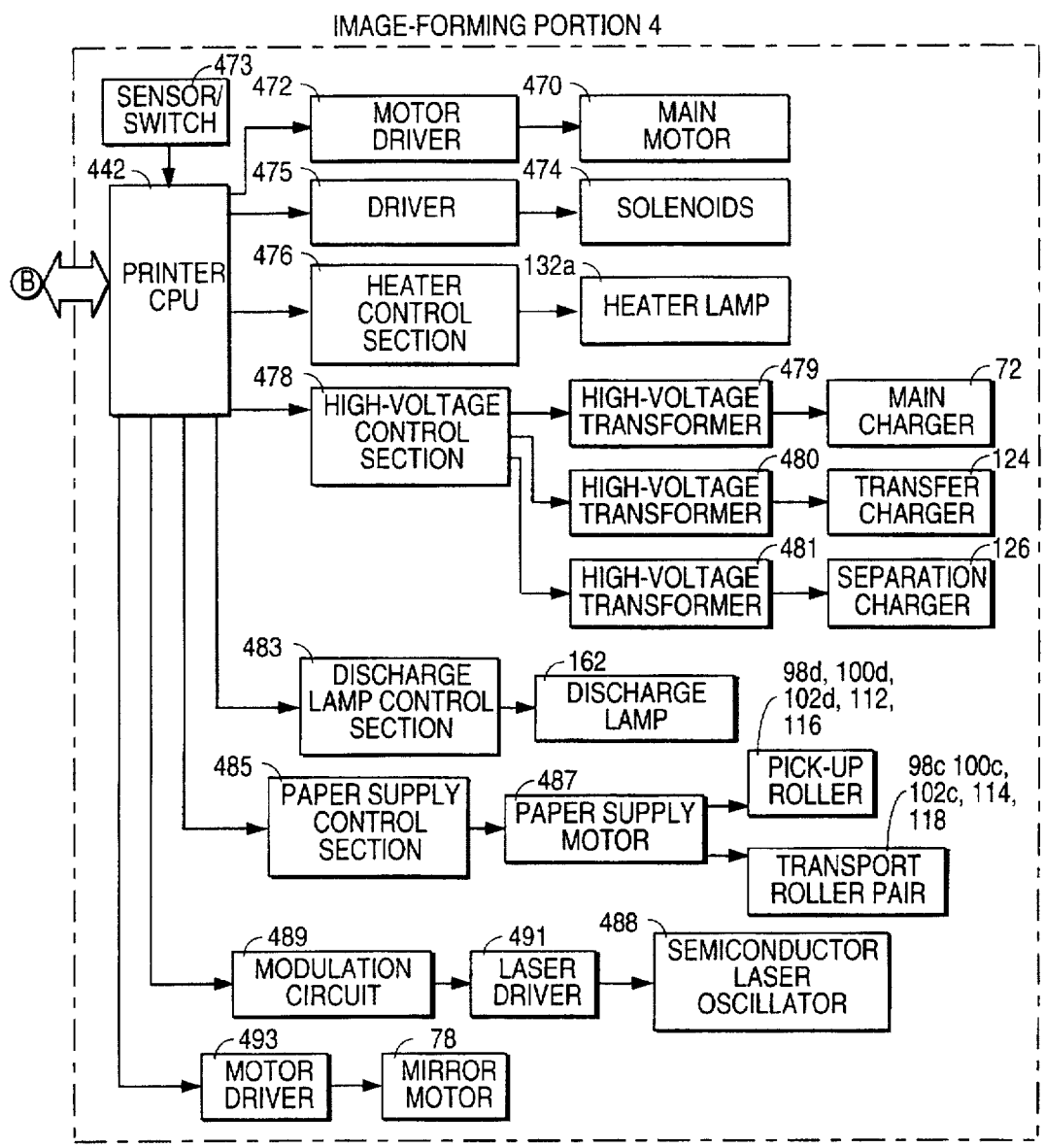

Also, main CPU 400 connects to a scanner CPU 440 and a printer CPU 442 as shown in FIG. 4(b) and FIG. 4(c).

Scanner CPU 440 connects to exposure lamp 58 via a lamp controller 450 for controlling exposure lamp 58, a scanning motor 452 via a motor driving circuit 454 for controlling scanning motor 452, and an input device 456 including sensors and switches. Scanning motor 452 moves first carriage 50 and second carriage 52 in a reciprocating fashion. Furthermore, scanner CPU 440 connects to CCD sensor 56, an A/D converter 458, a resolution converter 460, a shading correction circuit 462, a picture quality improving circuit 464, and a binarizing circuit 466. A/D converter 458 converts the electric signals output by CCD sensor 56 into digital data. Resolution converter 460 converts the resolution of CCD sensor 56 into that of image-forming portion 4 or to process signals in accordance with degree of magnification or reduction ratio. The digital signals output by resolution converter 462 are subjected to shading correction in shading correction circuit 462. Picture quality improving circuit 464 subjects the output signals from shading correction circuit 462 to an edge emphasis and a 7 correction. Binarizing circuit converts the output signals from picture quality improving circuit 464 into binary signals and transfers the binary signals to scanner CPU 440.

On the other hand, printer CPU 442 connects to a main motor 470 via a motor driver 472 for driving main motor 470, an input device 473 including sensors and switches, solenoids 474 arranged in image-forming portion 4 via a driver 475, and heater lamp 132a via a heater control section 476. Main motor 470 drives photosensitive drum 70, developing roller 90a, conveyer belt 128, heat roller 132, and exit roller pair 138. Printer CPU 442 connects to a high-voltage control section 478 which connects to main charger 72 via a high-voltage transformer 479, transfer charger 124 via a high-voltage transformer 480 and separation charger 126 via a high-voltage transformer 481. Also, printer CPU 442 connects to discharge lamp 162 via discharge lamp control section 483, and pick-up rollers 98c, 100c, 102c, 114, and 118, and transport roller pairs 98d, 100d, 102d, 112, and 116 via a paper-supply control section 485 and a paper-supply motor 487. Furthermore, printer CPU 442 connects to semiconductor laser oscillator 488 via a modulation circuit 489 for modulating the laser beam corresponding to image data and a laser driver 491, and mirror motor 78 via a motor driver 493.

According to the arrangement, each copying operation, facsimile operation, and printing operation is performed as follows.

[COPYING OPERATION]

Original D is set on platen by an operator or automatic-document feeder 8. In this condition, when copy key 300 is depressed, exposure lamp 58 radiates original D through platen 10. The light reflected from original D, which is exposed by exposure lamp 58, illuminates CCD sensor 56 via mirrors 62, 64, and 66 and lens block 54. At this time, first carriage 50 supporting exposure lamp 58, and second carriage 52, is moved a predetermined length corresponding to the original size in the direction of arrow RD by scanning motor 452. First carriage 50 and second carriage 52 are positioned an initial position in advance by using the output of sensor 456.

CCD sensor 56 outputs electric signals corresponding to the light intensity. A/D converter 458, resolution converter 460, shading correction circuit 462, picture quality improving circuit 464, and binarizing circuit 466 make binarized image data based on electric signals output from CCD sensor 56. Scanner CPU 440 stores the image data to image-data memory 406 via main CPU 400.

On the other hand, image-forming portion 4 rotates photosensitive drum 70 by main motor 470. After the surface of photosensitive drum 70 is wholly charged by main charger 72, the charged surface is exposed by laser beam LB from laser unit 74. Laser beam LB from laser unit 74 is based on the image data stored in image-data memory 406, and is made by modulation circuit 489, laser driver 491, and semiconductor laser oscillator 488. Then laser beam LB is reflected by polygon mirror 76 driven by mirror motor 78, and is supplied to the surface of photosensitive drum 70 as a line image. Thus, the electrostatic latent image is formed thereon. Then, the electrostatic latent image is developed into a toner image by developing unit 90. Transfer charger 124 transfers the toner image to paper sheet P which is transported to transfer region TR. Separation charger 126 separates paper sheet P with the toner image from the surface of photosensitive drum 70. After that, paper sheet P with the toner image is transported to fixing unit 130. After fixation, paper sheet P is discharged into tray 136.

[FACSIMILE OPERATION]

When copying machine 2 transmits the image of original D to another machine through telephone circuit 432, image-scanning portion 6 makes the image data in the same fashion as during the copying operation. Main CPU 400 transmits the image data to the other machine through facsimile interface 424 and telephone circuit 432.

When copying machine 2 receives image data from another machine through telephone circuit 432, main CPU 400 initially receives an input signal indicating the presence of telegraphic communication from telephone circuit 432 through facsimile interface 424. Then, main CPU 400 receives the image data. Image-forming portion 4 forms an image corresponding to the image data just as in the copying operation. If telephone circuit 432 is busy when copying machine 2 transmits an image data to the other machine, or image-forming portion 4 is busy when copying machine 2 receives an image data from the other machine, then main CPU 400 temporarily stores the image data to image-data memory 406. After those portions become free, the main CPU 400 performs the following operation by using the image data stored in image-data memory 406.

[PRINTING OPERATION]

When main CPU 400 receives image data from external output unit 434 through printer interface 426, main CPU transmits the image data to image-forming portion 4. Image-forming portion 4 forms an image corresponding to the image data in the same fashion as during the copying operation. If image-forming portion 4 is busy when copying machine 2 receives the image data, then main CPU 400 temporarily stores the image data to image-data memory 406. After image-forming portion 4 becomes free, the main CPU 400 causes image-forming portion 4 to perform the following operation by using the image data stored in image-data memory 406.

While image-forming portion 4 is busy, printer CPU 442 transmits a busy signal to main CPU 400. When the main CPU 400 receives the busy signal, main CPU 400 causes LED display 336 to turn on through internal interface 418. In this case, however, if the image-scanning portion 6 is usable, main CPU 400 initiates the image input mode.

Figure 5A:
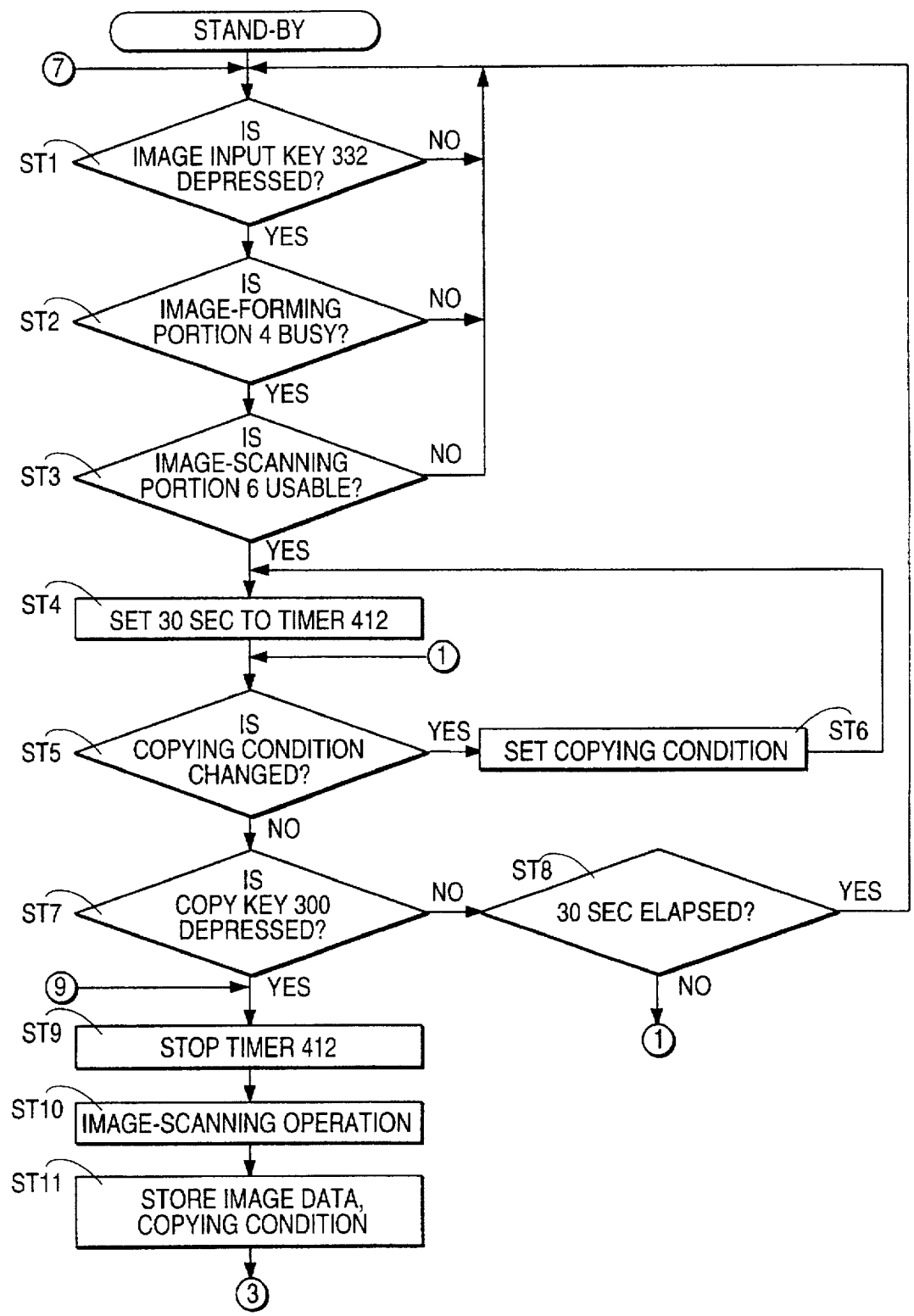
FIGS. 5(a) and 5(b) are flow charts for illustrating the operation of the control system shown in FIGS. 4(a) to 4(c)
Figure 5B:
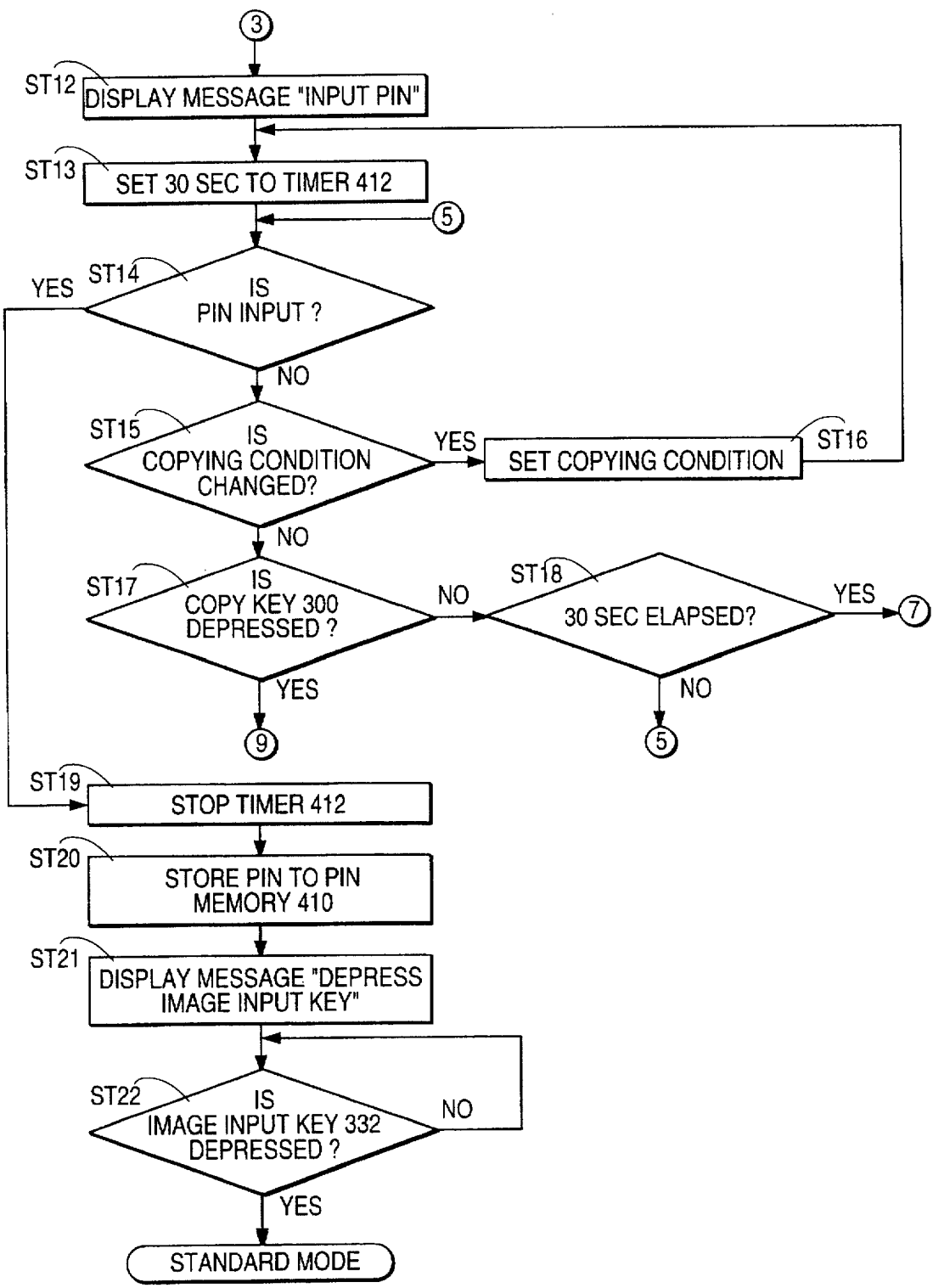

The operation of copying machine 2 in the image input mode and the image output mode will be described in detail in reference to FIGS. 5(a), 5(b), and 6.

When copying machine 2 is in the stand-by condition, if the image input key 332 is depressed, the main CPU 400 checks whether the image-forming portion 4 is busy and the image-scanning portion 6 is usable (steps ST1, ST2, ST3). If the main CPU 400 determines that the image-forming portion 4 is busy and the image-scanning portion 6 is usable, then copying machine 2 proceeds to the image input mode, and the main CPU 400 sets a 30-sec interval to timer 412 (step ST4). Then, main CPU 400 checks whether the copying condition, e.g., the copy density, the enlargement or reduction ratio, the number of copies, and the modification of characters, has been changed from a standard condition to an operator selectable one by using control panel 200 (step ST5). If main CPU 400 determines that the copying condition has been changed, then main CPU 400 sets the changed copying condition, and returns to step ST4 (step ST6). On the other hand, if the main CPU 400 determines that the copying condition has not been changed, then main CPU 400 checks whether copy key 300 is depressed (step ST7). At this time, if main CPU 400 determines that copy key 300 is not depressed, then main CPU 400 checks timer 412 for completion of the 30-sec interval (step ST8). If the main CPU 400 determines that timer 412 has not timed out, then the flow returns to step ST5. If the main CPU 400 determines that timer 412 has timed out, then the copying machine 2 returns to the stand-by condition.

If at step ST7 the main CPU 400 determines that copy key 300 is depressed, then the main CPU 400 stops operation of timer 412, and makes the image-scanning portion 6 perform the image-scanning operation (steps ST9 and ST10). Then, the main CPU 400 stores the image data output by the image-scanning portion 6 with the copying condition into image-data memory 406 (step ST11), and causes display section 328 to display a message "INPUT PERSONAL IDENTIFICATION NUMBER" (step ST12). After that, main CPU 400 sets timer 412 to 30 sec (step ST13), and then checks that the personal identification number is input by using keys 302 (step ST14). If main CPU 400 determines that the personal identification number is not input, then main CPU 400 checks whether the copying condition has been changed again (step ST15). If the main CPU 400 determines that the copying condition has been changed, then main CPU 400 sets the changed copying condition and returns to step 13 (step ST16). On the other hand, if main CPU 400 determines that the copying condition has not been changed, then main CPU 400 checks whether copy key 300 is depressed (step ST17). If main CPU 400 determines that copy key 300 is not depressed at step ST17, then main CPU 400 checks whether timer 412 has timed out (step ST18). If main CPU 400 determines at step ST18 that timer 412 has not completed the 30-sec count, then the flow returns to step ST14. If main CPU 400 determines that timer 412 has timed out, then copying machine 2 returns to the stand-by condition. At the same time, main CPU 400 eliminates the image data and the copying condition stored in image-data memory 406. In this case, if the personal identification number is not input within a predetermined time period, the image data and the copying condition are effectively destroyed by rendering them irretrievable—inaccessible in any output mode.

At step ST14, if main CPU 400 determines that the personal identification number is input, then main CPU 400 stops the counting operation of timer 412 (step ST19), and stores the personal identification number to PIN memory 410 so that the image data with the copying condition data and the personal identification number are paired (step ST20). After that, the main CPU 400 causes the display section 328 to display a message "DEPRESS IMAGE INPUT KEY" (step ST21). When image input key 332 is depressed, copying machine 2 returns from the image input mode to the standard mode. In the standard mode copying, printing and facsimile operations can be made without the use of a PIN number in a normal fashion.

In this case, an operator inputs the personal identification number. However, this is one of five options for associating the image data with the copying condition, and has been selected in advance by an operator. The second through fifth options are as follows. In the second option, the main CPU 400 makes a personal identification number at random, and causes display section 328 to display the personal identification number instead of the message at step ST12, for example, "PIN IS [1234]. AFTER CONFIRMATION, DEPRESS "YES" KEY.". If an operator notes down the personal identification number and depresses the YES key of operation guide keys 316, then the flow advances to step ST20.

In the third option, main CPU 400 generates a portion of a personal identification number at random, and causes display section 328 to display the personal identification number portion and a requesting message instead of the message at step ST12, for example, "PIN OF FIRST HALF IS [12 - - - ], INPUT PIN OF SECOND HALF.". After that the flow advances to the step ST13.

In the fourth option, main CPU 400 causes display section 328 to display a message instead of the message at step 12, for example, "INSERT YOUR ID CARD INTO ID CARD SLOT.". If the ID card is inserted into ID card sot 206, ID card reader/writer 414 reads out the identification number which the ID card has, and the main CPU 400 stores the identification number to PIN memory 410. After that, the flow advances to step ST20.

In the fifth option, main CPU 400 causes display section 328 to display a message instead of the message at step ST12, for example, "INSERT YOUR ID CARD INTO ID CARD SLOT. THEN, INPUT PIN.". If main CPU 400 determines that the ID card is inserted into ID card slot 206, then the flow advances to step ST13.

The image data which has been stored in image-data memory as described above, is output as follows.

Figure 6:
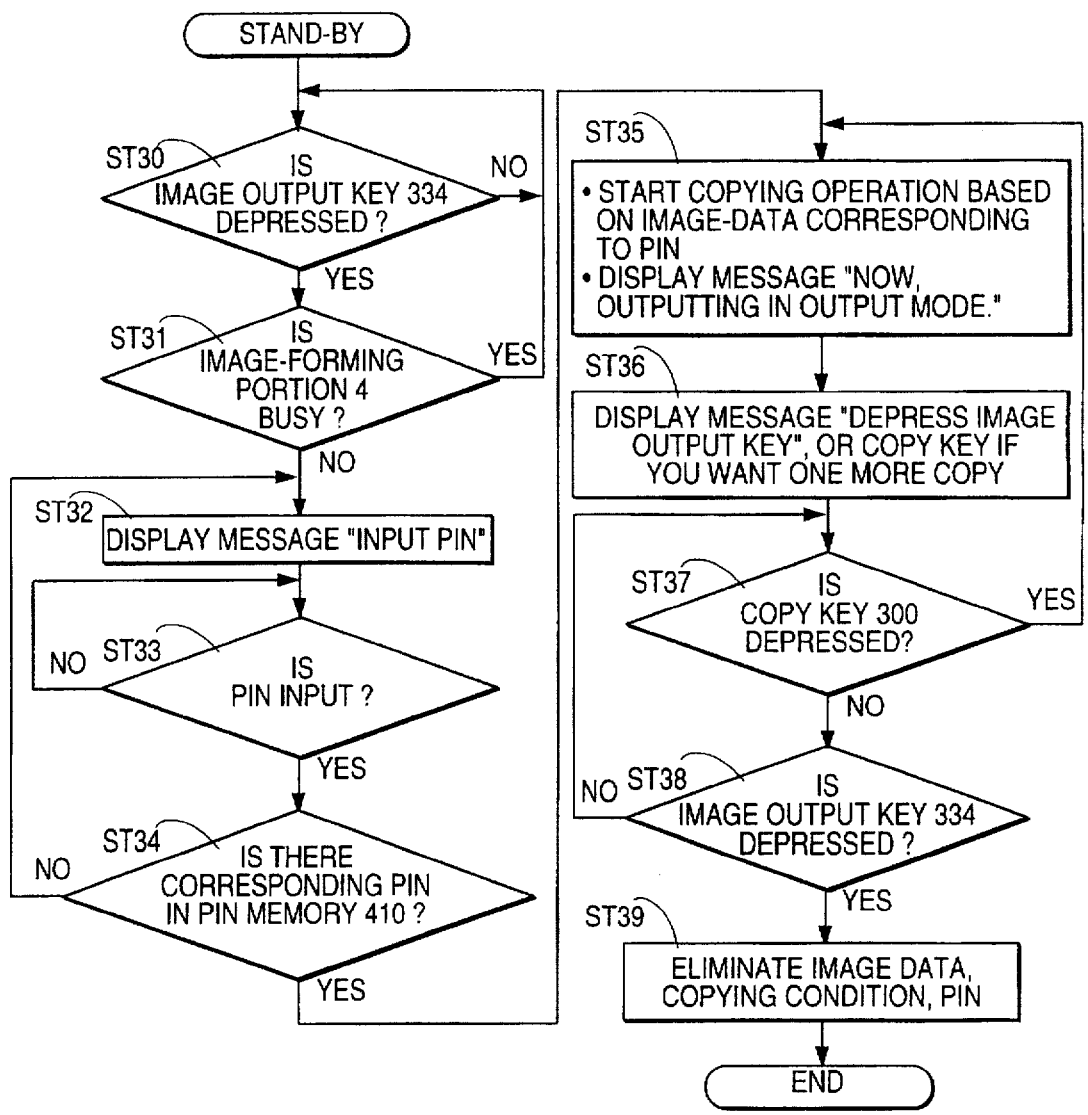
FIG. 6 is a flow chart for illustrating the operation of the control system shown in FIGS. 4(a) to 4(c)

As shown in FIG. 6, if image output key 334 is depressed while image-forming portion 4 is not busy, in other words, is usable, the main CPU 400 causes display section 328 to display the message "INPUT PIN." (steps ST30, ST31, and ST32). In this condition, when the personal identification number is input by using keys 302, main CPU 400 checks whether there is the personal identification number in PIN memory 410 (steps ST33 and ST34). Copying machine 2 is coupled to copying machines 2A, 2B, 2C, 2D, 2E, and 2F (see FIG. 7) through external interface 422 and LAN 430. Each copying machine 2A, 2B, 2C, 2E, and 2F has the same structure as copying machine 2, and each machine thus has a PIN memory. The image-data memory 406 and PIN memory 410 of each machine 2, 2A, 2B . . . 2F is accessible by the main CPU 400 of every other machine so that the image may be printed out from any machine on the network. Thus, when the main CPU 400 of machine 2 checks at step ST34, main CPU 400 of machine 2 looks up each PIN memory of copying machines 2A, 2B, 2C, 2E, and 2F as well as its own PIN memory. If main CPU 400 determines that there is not a personal identification number corresponding to the input PIN number, then the flow returns to step ST32. On the contrary, if the main CPU 400 determines that there is a personal identification number even if it is in one of copying machines 2A, 2B, 2C, 2D, 2E, and 2F, then main CPU 400 of machine 2 causes its image-forming portion 4 to perform the image-forming operation based on the image data corresponding to the personal identification number. When image-forming portion 4 forms an image, the image-forming condition is set to that stored in image-data memory 406 together with the image data. At the same time, main CPU 400 of machine 2 causes display section 328 to display a message "NOW, OUTPUTTING IN OUTPUT MODE." (step ST35).

After the copying operation, main CPU 400 causes display section 328 to display a message "DEPRESS IMAGE OUTPUT KEY. OR COPY KEY IF YOU WANT ONE MORE COPY." (step ST36). Next, main CPU 400 checks whether copy key 300 is depressed (step ST37). If main CPU 400 determines that copy key 300 is depressed, then the flow returns to step ST35. On the other hand, if main CPU 400 determines that copy key 300 is not depressed, main CPU 400 checks whether image output key 334 is depressed. If main CPU 400 has determined that image output key 334 has not been depressed, then the flow returns to step ST37. When image output key 334 is depressed, copying machine 2 returns from the image output mode to the standard mode after deleting the image data, the copying condition data, and the personal identification number from image-data memory 406 and PIN memory 410 from the machine in which such data was stored (step ST39).

It is also contemplated that the invention includes the use of a plurality of machines 2, 2A, 2B . . . 2F in which not all of the machines are identical. Instead, machine 2A, 2B may, for example, have a simpler structure and include only the image-scanning portion 6 (FIG. 4(b)) but not the image-forming portion 4 (FIG. 4(c)). In this manner, the image may be scanned and stored, together with the PIN and/or time T(n) identifying data in units 2A, 2B, and later printed out using any of the other units 2, 2C, 2D . . . 2F. Units 2A, 2B are thus used essentially as remote input devices and many be simply produced at a relatively low cost.

FIGS. 8(a), 8(b), 9 and 10 show a second embodiment in relation to an operation of the control system. In this embodiment, an operator inputs an output time data in the image input mode instead of inputting a personal identification number. When the output time occurs, copying machine 2 automatically outputs a copy corresponding to an image data which has been input in the image input mode.

Figure 8A:
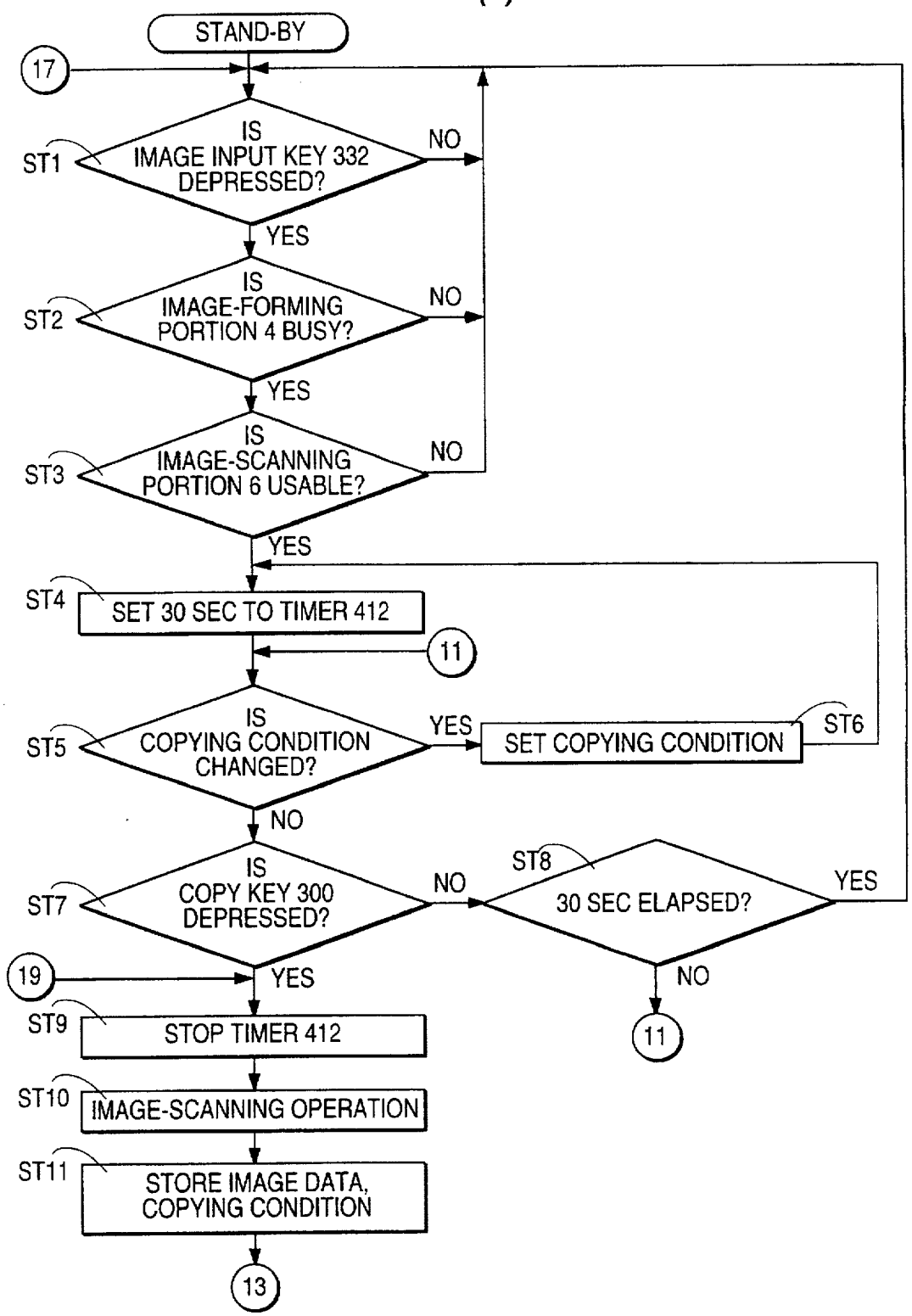
FIGS. 8(a) and 8(b) are flow charts for illustrating the operation of a second embodiment of the control system shown in FIGS. 4(a) to 4(c)
Figure 8B:
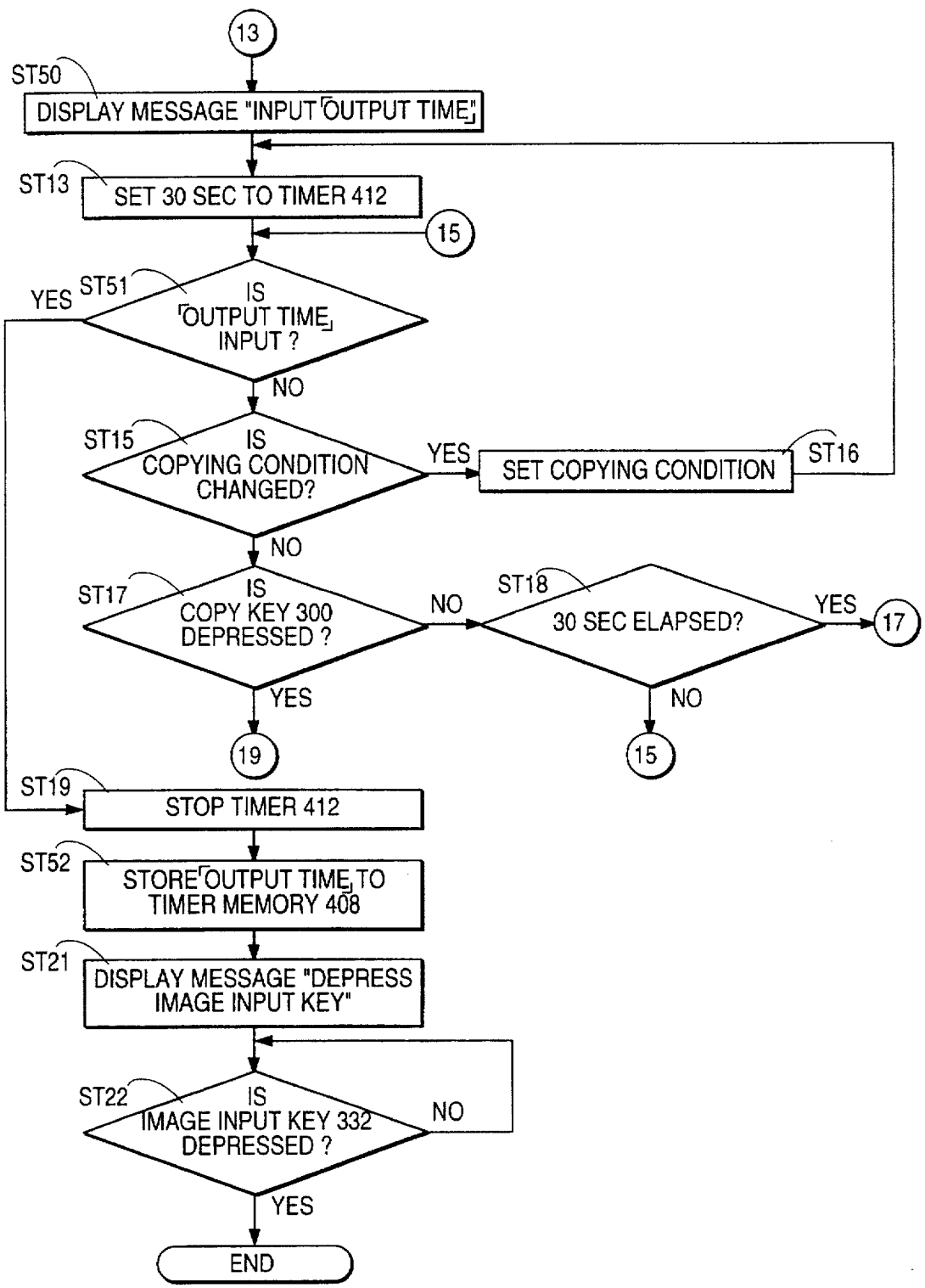

As shown in FIG. 8(a), step ST1 to step ST11 are the same as that of the first embodiment. After that, as shown in FIG. 8(b), main CPU 400 causes display section 328 to display a message "INPUT [OUTPUT TIME.]" (step ST50). After step ST13, main CPU 400 checks whether the output time is input by an operator (step ST51). When the operator inputs the output time, keys 302 is used and four figures are input to the control system. If the four figures which has been input is, for example, [1440], then main CPU 400 recognizes it as the time "14:40".

If main CPU 400 determines at step 51 that the output time is input, then main CPU 400 stores the output time data to timer memory 408 so that the image data with the copying condition data and the output time data are paired (step ST52). Finally, main CPU 400 performs steps ST21 and ST22.

Figure 9:
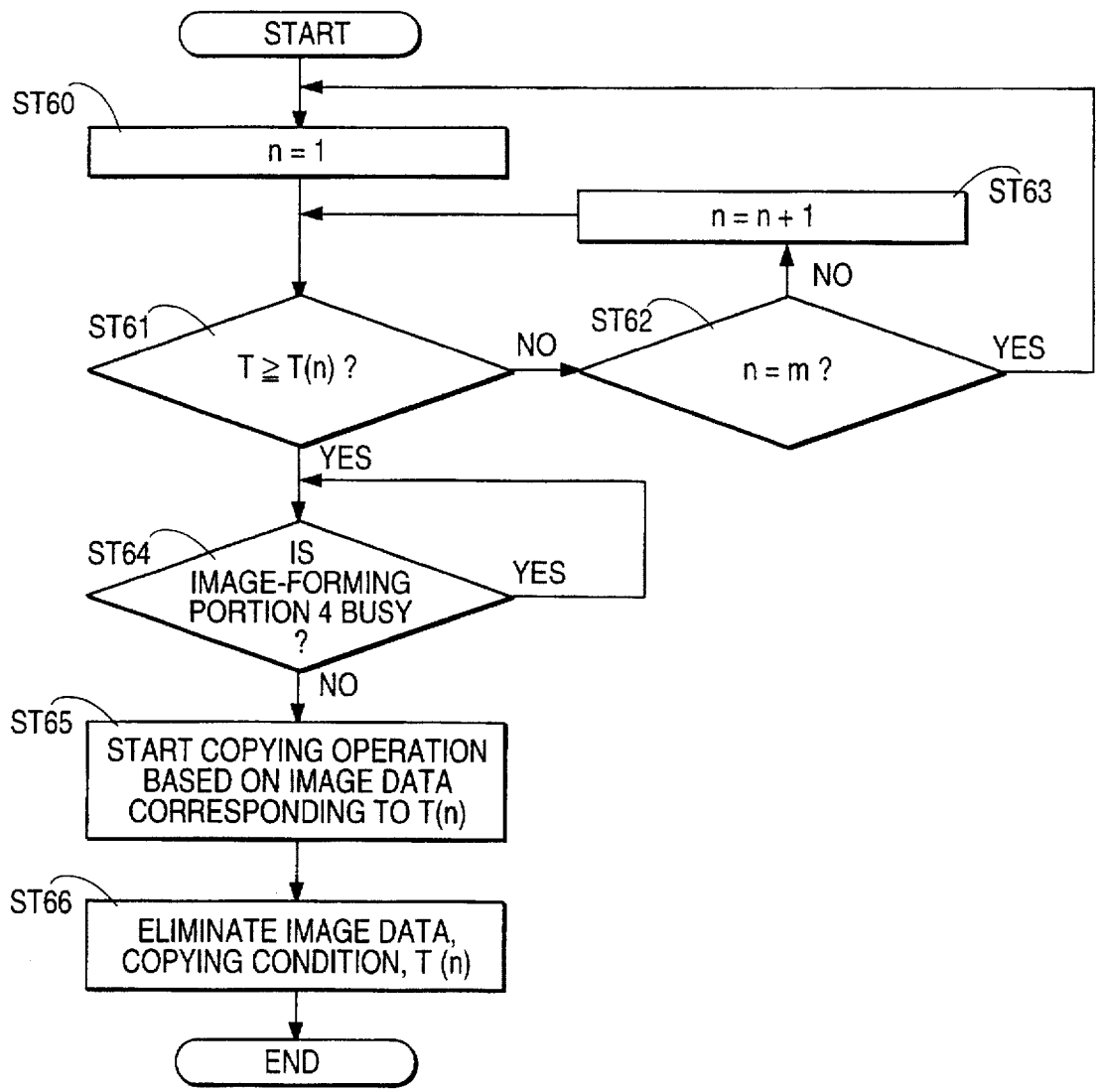
FIG. 9 is a flow chart for illustrating the operation of the second embodiment of the control system.

After the image data, the copying conditions data, and the output time data are input, main CPU 400 automatically begins checking whether the real time equals or exceeds the output time as shown in FIG. 9. Main CPU 400 recognizes the real time by an internal clock thereof. Thus, sets of data are stored which have the output time and the corresponding image data and copying condition. These groups of data are stored in image-data memory 406 and timer memory 408, as shown in FIG. 10.

Main CPU 400, at first, checks whether the real time, T, is less than the output time T(1) of the first set of data (steps ST60 and ST61). If main CPU 400 determines that the real time is earlier than output time T(1), then main CPU 400 checks whether all sets has been checked (step ST62). If main CPU 400 determines that all sets has been checked, then the flow returns to step ST60. On the other hand, if main CPU 400 determines that all sets have not been checked yet, then the main CPU 400 checks whether the real time is less than the output time T(2) of the second set (steps ST63 and ST61).

It is understood by those skilled in the art that step ST61 need not be implemented exactly as shown. The purpose of this step is to determine when the real (actual) time, T, is equal to the output time T(n). This condition may equivalently be met if the software functions to determine any of the following: T≦T(n); T=T(n); T≧T(n); T<T(n) or T>T(n).

If main CPU 400 determines at step ST61 that the real time is greater than or equal to the output time T(n), then main CPU 400 waits until image-forming portion 4 is usable (step ST64). When image-forming portion 4 is usable, main CPU 400 causes image-forming portion 4 to perform the image-forming operation based on an image data I(n) corresponding to output time data T(n) (step ST65). When image-forming portion 4 forms an image, an image-forming condition C(n) is set to that stored in image-data memory 406 with the image data I(n). After that, main CPU 400 deletes image data I(n), copying condition C(n), and output time data T(n) from image-data memory 406 and timer memory 408, thereby ensuring that third parties will not have access to the data.

Figure 11A:
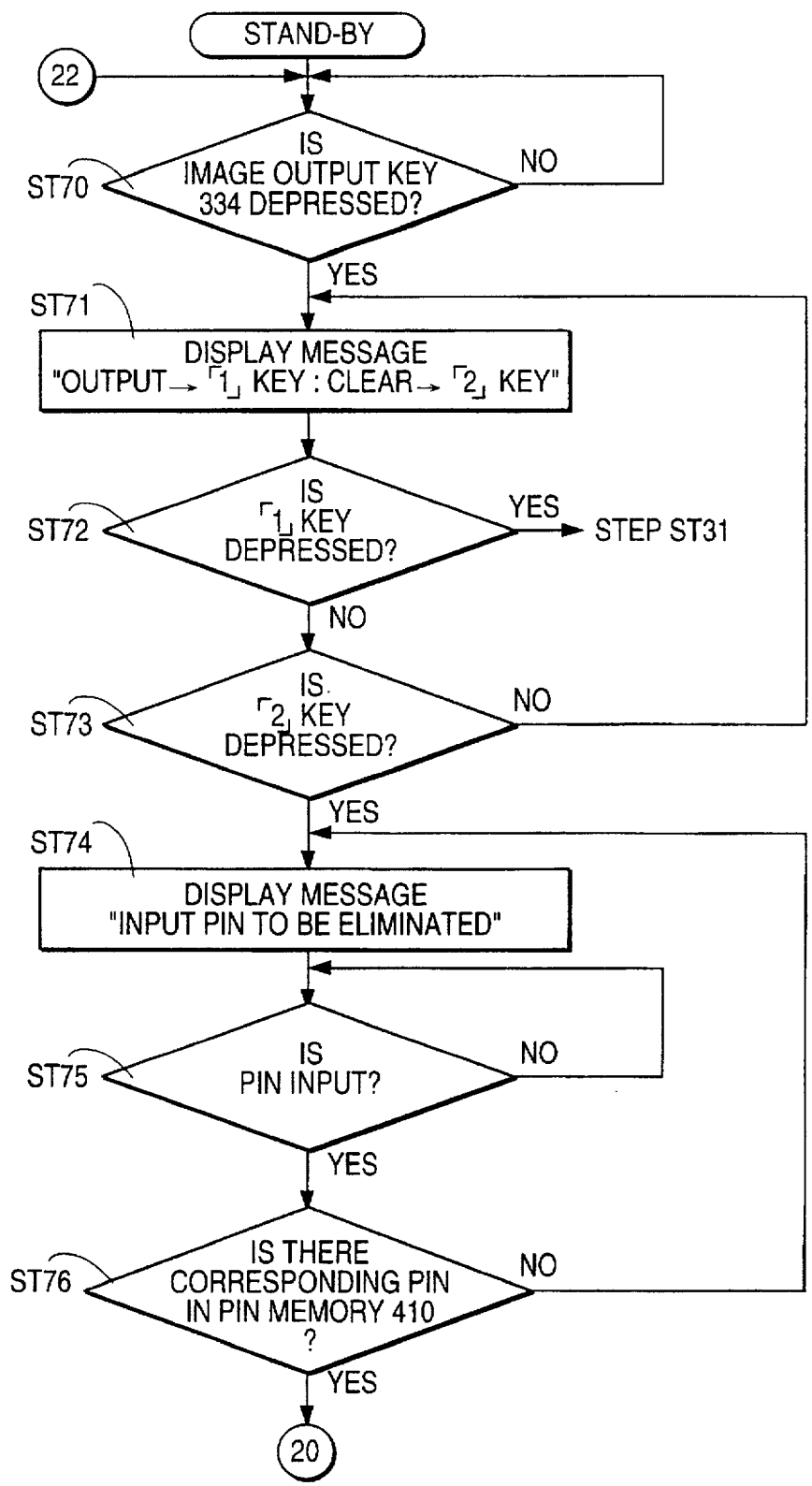
FIGS. 11(a) and 11(b) are flow charts for illustrating the operation of a third embodiment of the control system shown in FIGS. 4(a) to 4(c)
Figure 11B:
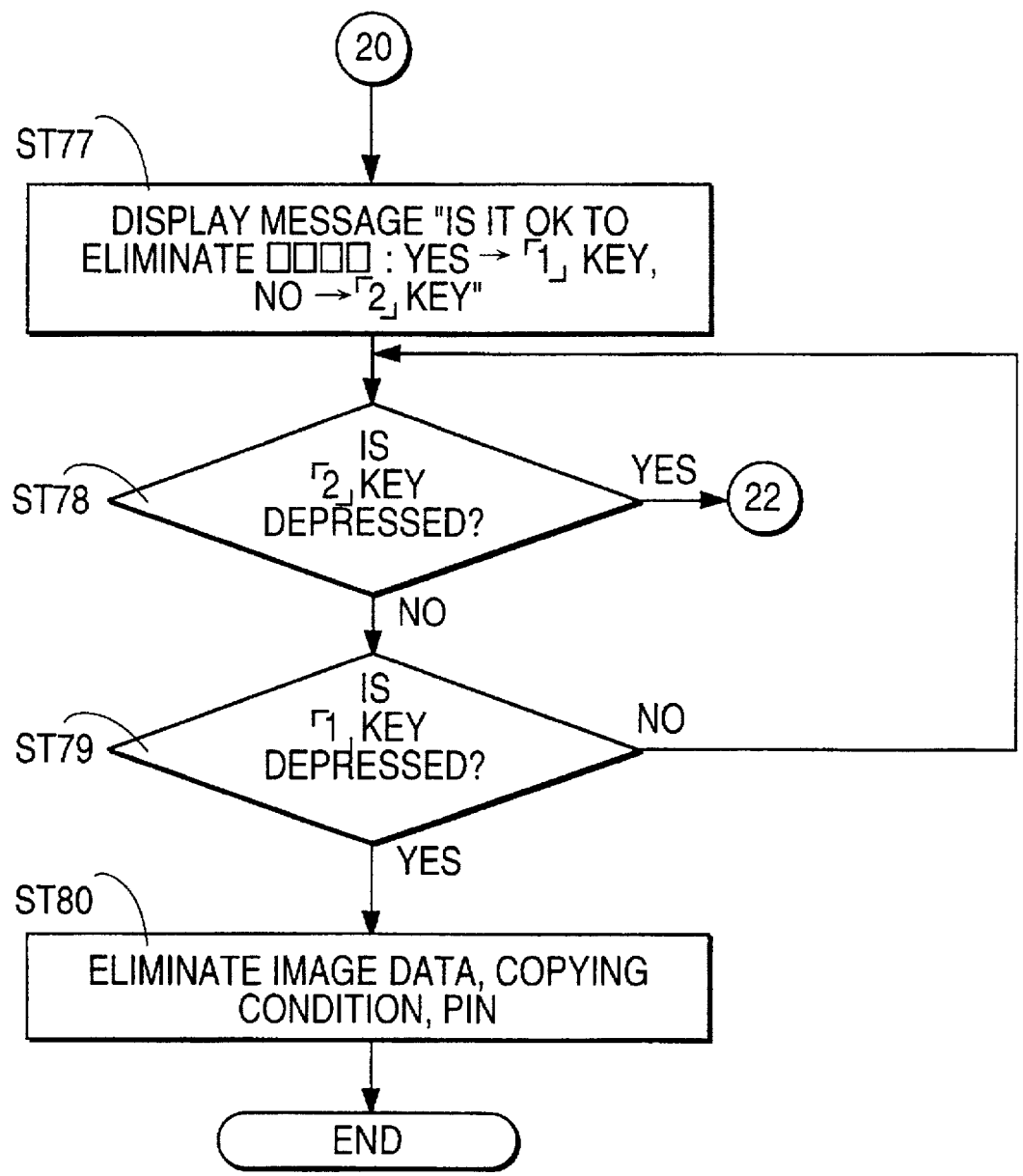

FIGS. 11(a) and 11(b) show a third embodiment in relation to an operation of the control system. In this embodiment, an operator is allowed to eliminate an image data, a copying condition data, and a personal identification number before making a copy image on the basis of the image data. This function is helpful for an operator when the operator notices that it does not need to make the copy image.

When copying machine 2 is in the stand-by condition and image output key 334 is depressed by an operator, main CPU 400 causes display section 328 to display a message "OUTPUT→⌐1⌐ KEY: CLEAR→⌐2⌐ KEY" (steps ST70 and ST71). In this condition, if the "1" key is depressed, the flow advances to step ST31 in FIG. 6, and copying machine 2 is set in the image output mode (step ST172). If the "2" key is depressed, then main CPU 400 causes display section to display a message "INPUT PIN TO BE ELIMINATED", and copying machine 2 is set in an image data clear mode (steps ST73 and ST74).

After the personal identification number is input by using keys 302, main CPU 400 checks whether there is a personal identification number in PIN memory 410 (steps ST75 and ST76). If main CPU 400 determines that there is not a personal identification number, then the flow returns to step ST74. On the contrary, if main CPU 400 determines that there is the personal identification number, then main CPU 400 causes display section 328 to display a message "IS IT OK TO ELIMINATE ☐ ☐ ☐ ☐: YES→⌐1⌐ KEY, NO→⌐2⌐ KEY" (step ST77). Display section 328 displays the identification number in the area "☐ ☐ ☐ ☐" as four figures. If the "2" key is depressed, copying machine 2 returns to the stand-by condition (step ST78). On the other hand, if the "1" key is depressed main CPU 400 deletes the personal identification number data from PIN memory 410, and the image data and the copying condition data corresponding to the personal identification number from image-data memory 406 (steps ST79 and ST80).

Figure 12A:
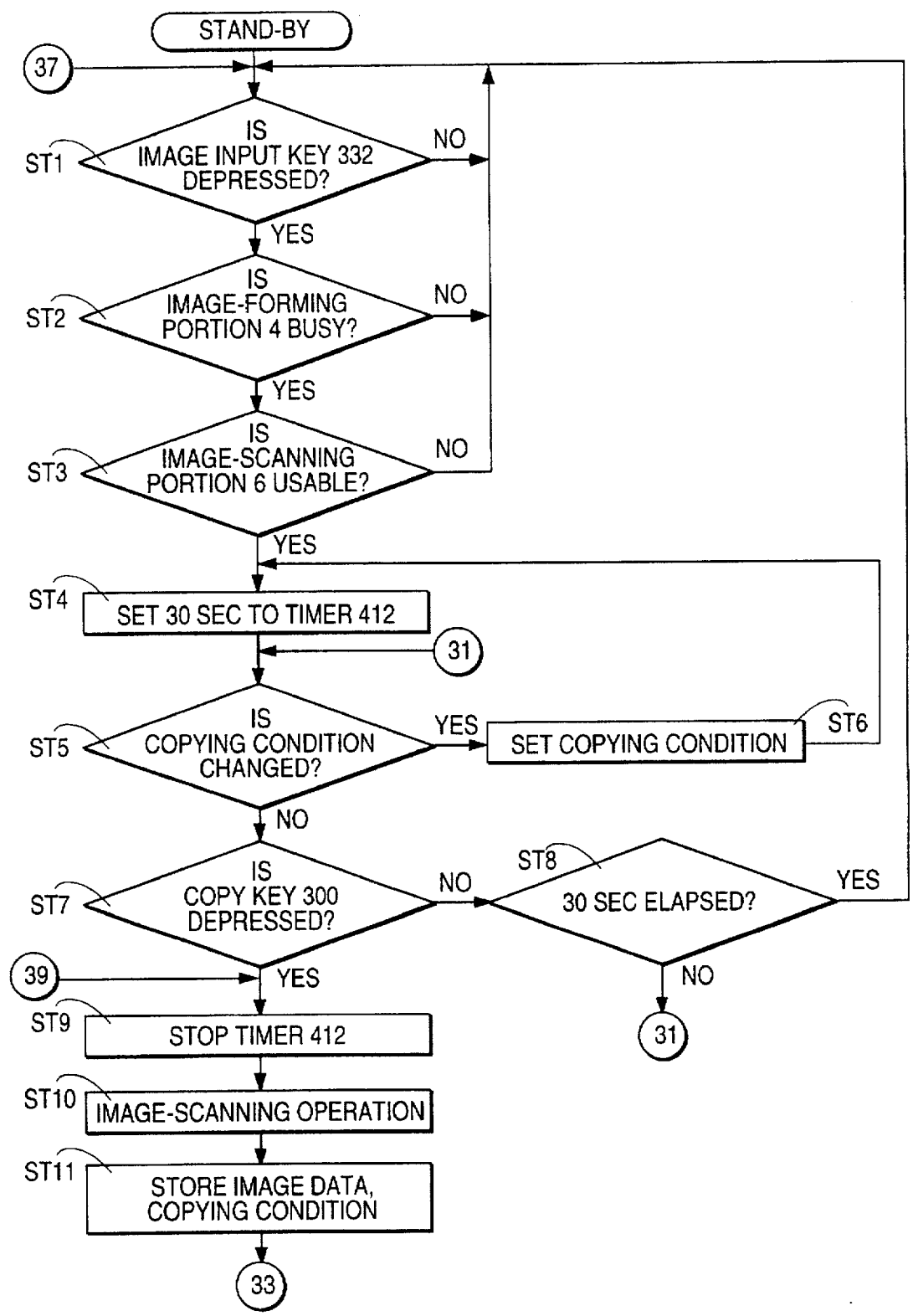
FIGS. 12(a) and 12(b) are flow charts for illustrating the operation of a fourth embodiment of the control system shown in FIGS. 4(a) to 4(c)
Figure 12B:
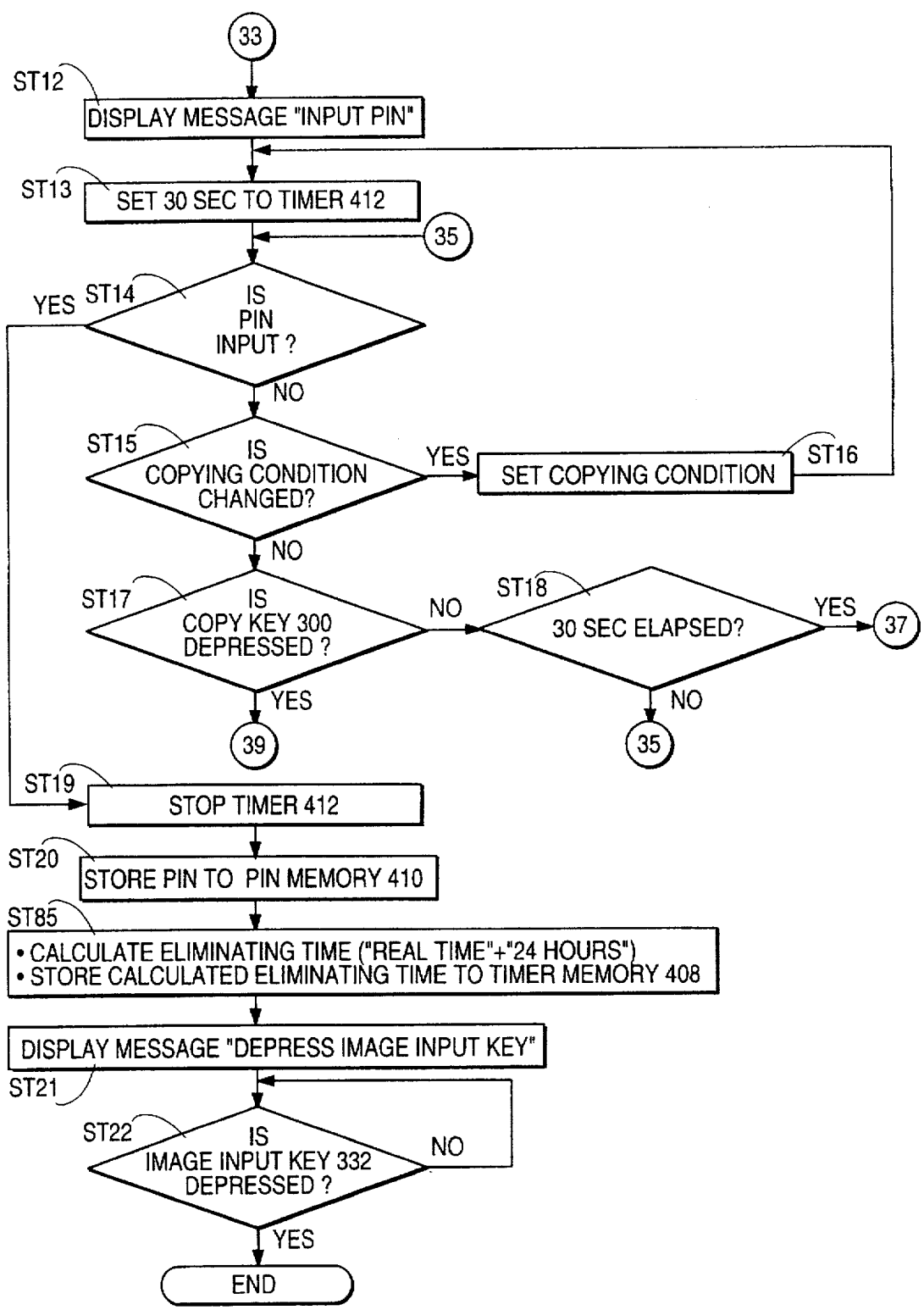

FIGS. 12(a) 12(b) and 13 show a fourth embodiment in relation to the image data clear mode. In this embodiment, when a predetermined time period elapsed after an image data is input, main CPU 400 automatically deletes the image data, the copying condition data, and the personal identification number data.

As shown in FIGS. 12(a) and 12(b), the start to step ST20 and step ST21 to the end of the flow chart are the same as that of the first embodiment. After step ST20, as shown in FIG. 12(b), main CPU 400 calculates a deletion time by adding to the real time the predetermined time period, for example 24 hours (step ST85). Next, main CPU 400 stores the calculated eliminating time to timer memory 408.

When copying machine 2 returns to the stand-by condition, as shown in FIG. 13, main CPU 400 automatically starts to check whether the real time is greater than or equal to the deletion time (steps ST90 to ST93). This checking operation is almost the same as steps ST60 to ST63 in FIG. 9. The difference between the flows is what "T(n)" represents. "T(n)" represents to the output time in FIG. 9. However, "T(n)" represents the deletion time in FIG. 13.

If main CPU 400 determines at step ST91 that the real time is greater than or equal to the deletion time T(n), then main CPU 400 deletes image data I(n), copying condition C(n), deletion time data T(n), and the personal identification number data from image-data memory 406, timer memory 408, and PIN memory 410 (step ST93). This function is helpful to prevent image-data memory 406, timer memory 408, and PIN memory 410 from storing useless data. In the meantime, before main CPU 400 eliminates the image data, main CPU 400 causes image-forming portion 4 to output a copy image corresponding to the image data according to a request of an operator.

Figure 14A:
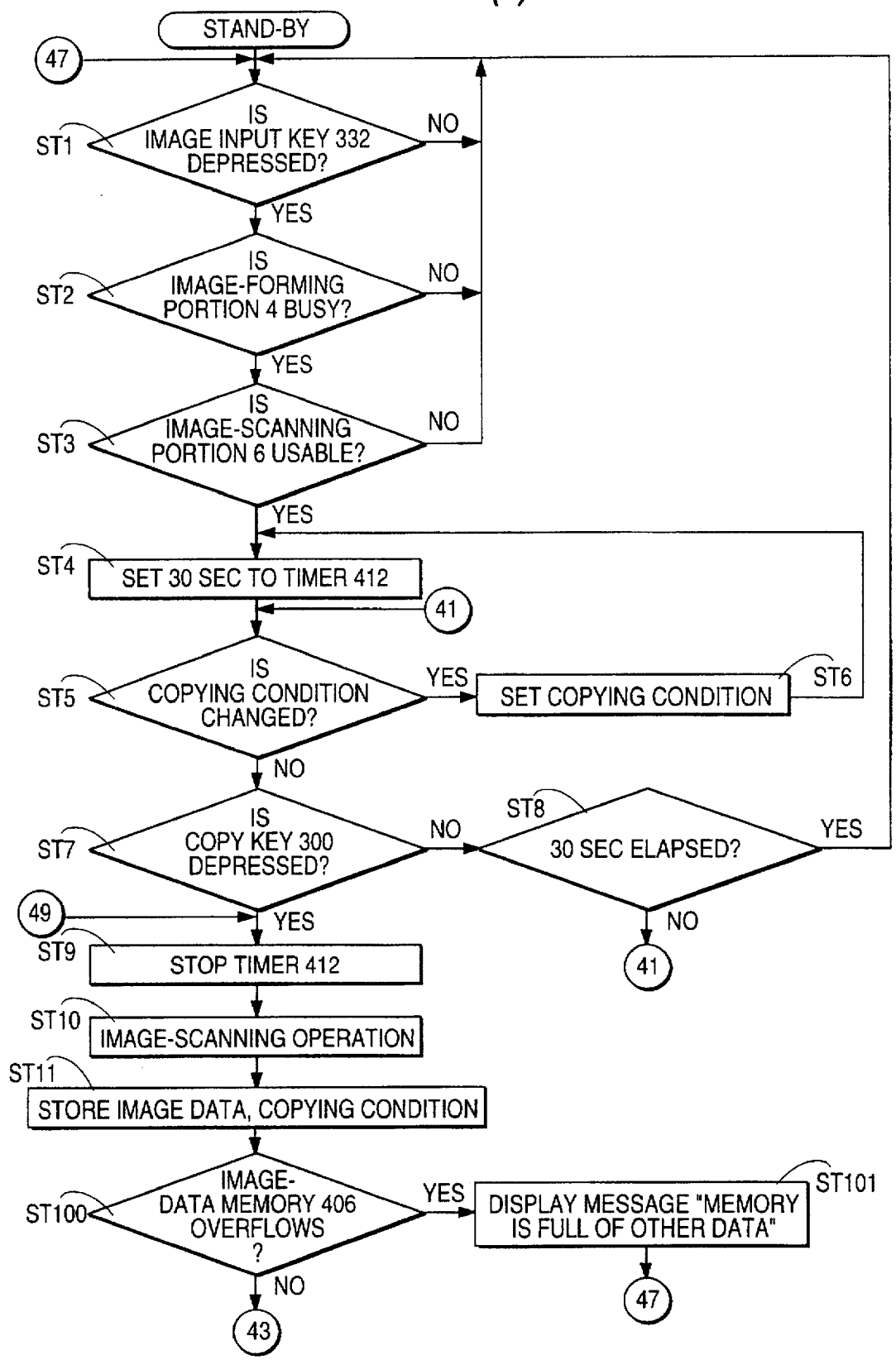
FIGS. 14(a) and 14(b) are flow charts for illustrating the operation of a fifth embodiment of the control system shown in FIGS. 4(a) to 4(c)
Figure 14B:
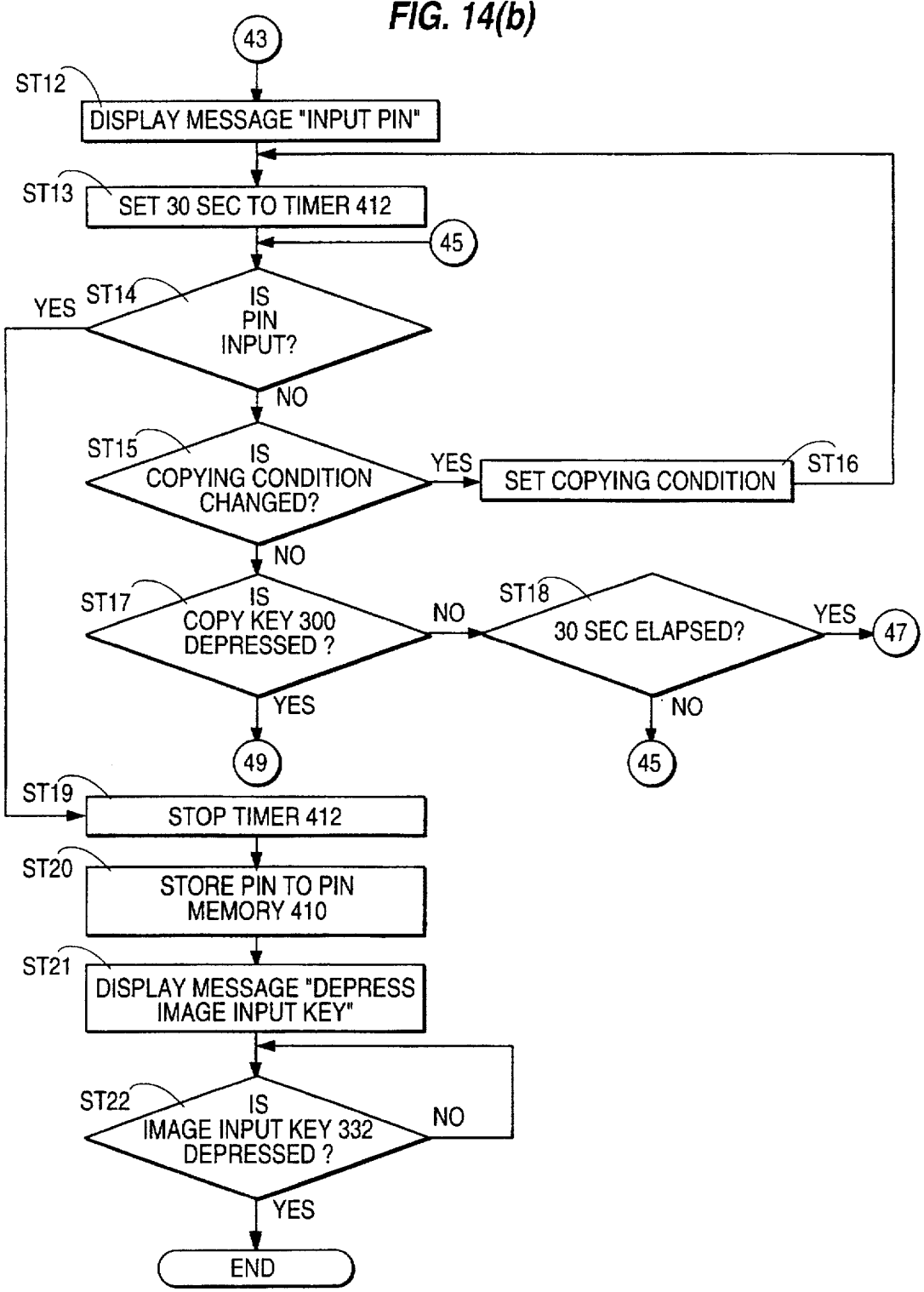

FIGS. 14(a) and 14(b) are a fifth embodiment in relation to an operation of the control system. In this embodiment, when main CPU 400 stores an image data to image-data memory 406, if memory 406 overflows, then the storing operation is prohibited.

As shown in FIGS. 14(a) and 14(b), the start to step ST11 and step ST12 to the end of the flow chart are the same as that of the first embodiment. Main CPU 400 checks whether image-data memory 406 overflows during storing the image data at step ST11 (step ST100). If main CPU 400 determines that image-data memory 406 does not overflow, then the flow advances to step ST12. On the other hand, main CPU 400 determines at step ST100 that image-data memory 406 overflows, then main CPU 400 stops storing the image data and causes display section 328 to display a message "MEMORY IS FULL OF OTHER DATA" (step ST101). After that, copying machine 2 returns to the stand-by condition.

Figure 15A:
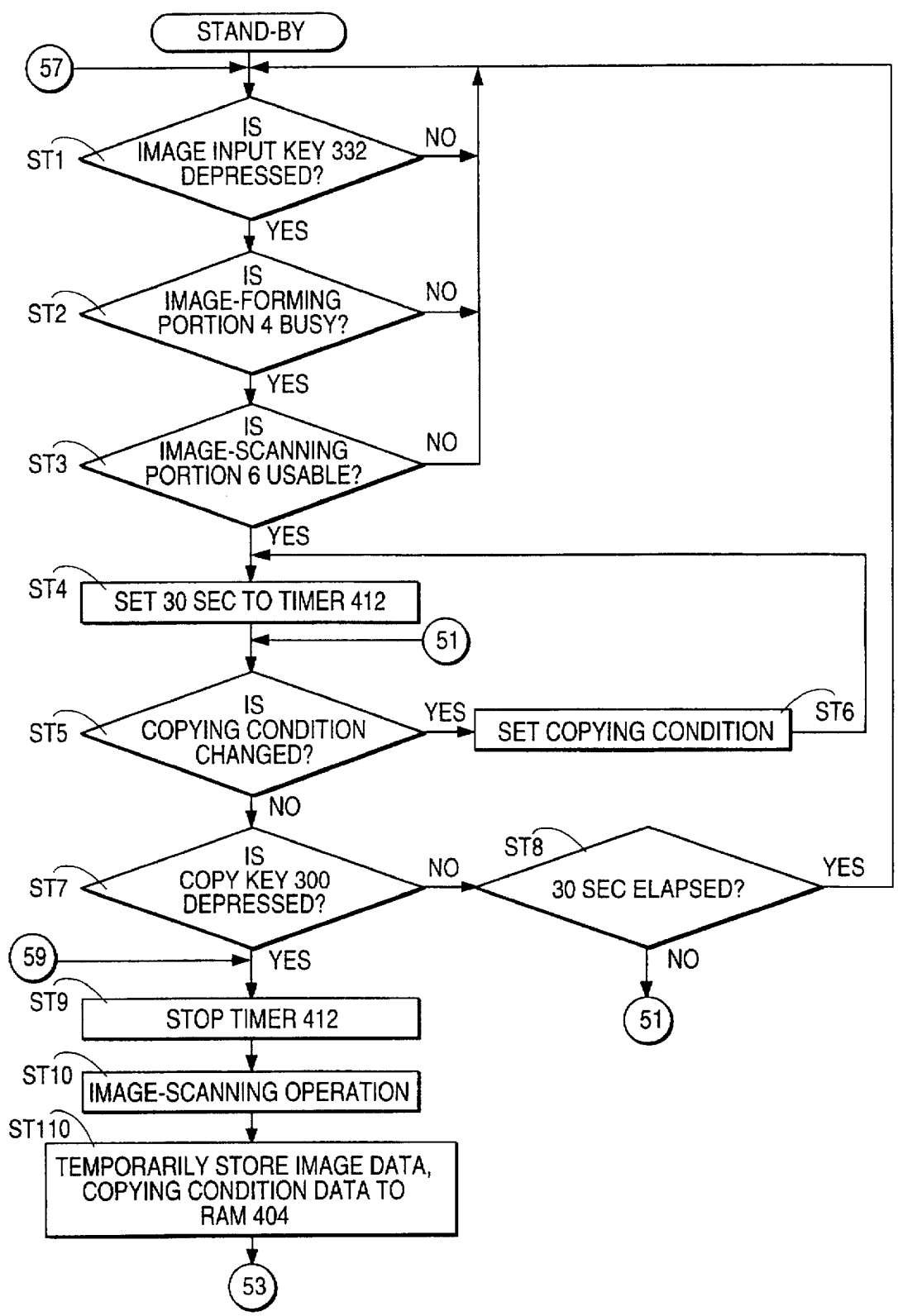
FIGS. 15(a) and 15(c) are flow charts for illustrating the operation of a sixth embodiment of the control system shown in FIGS. 4(a) to 4(c).
Figure 15B:
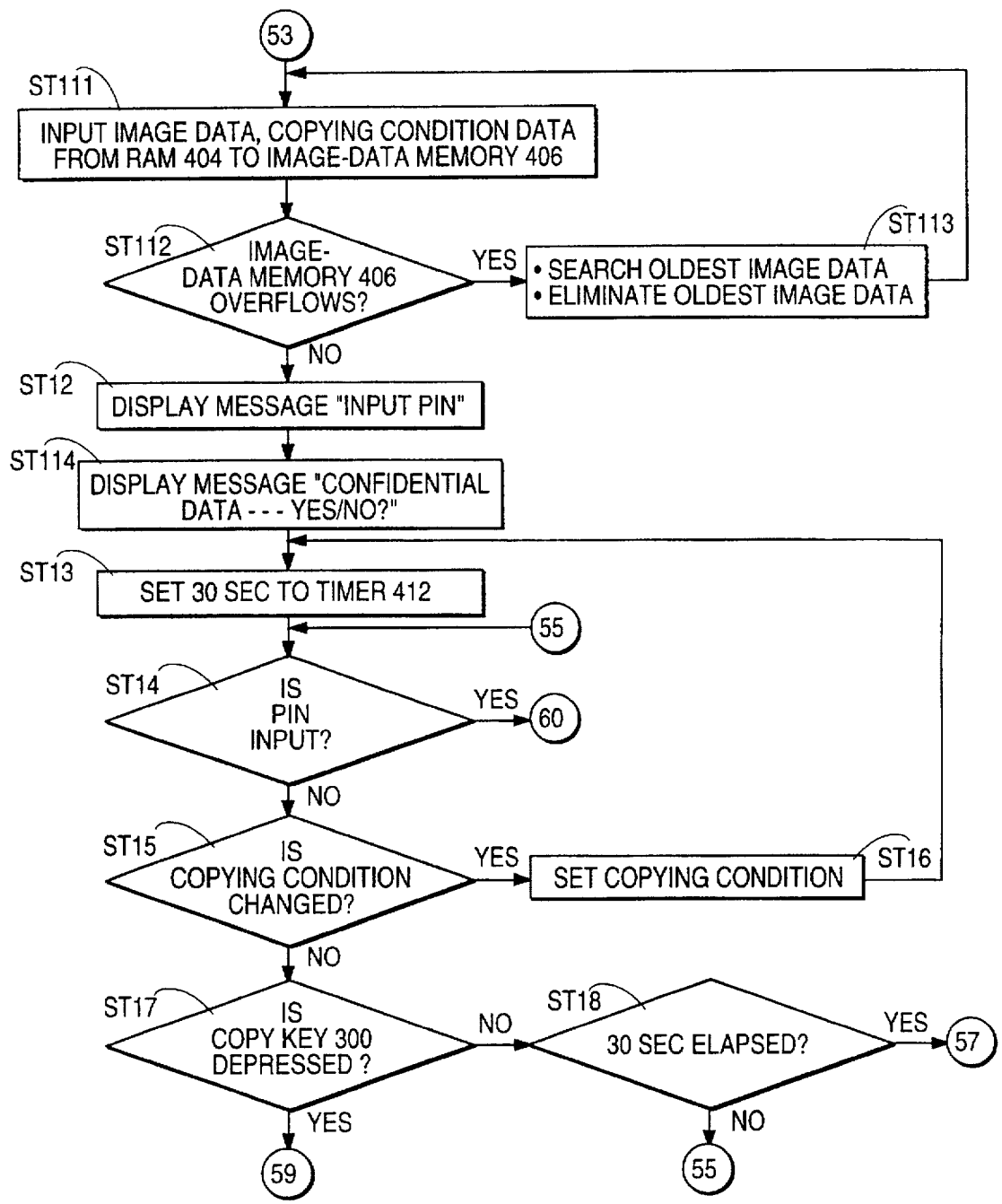
Figure 15C:
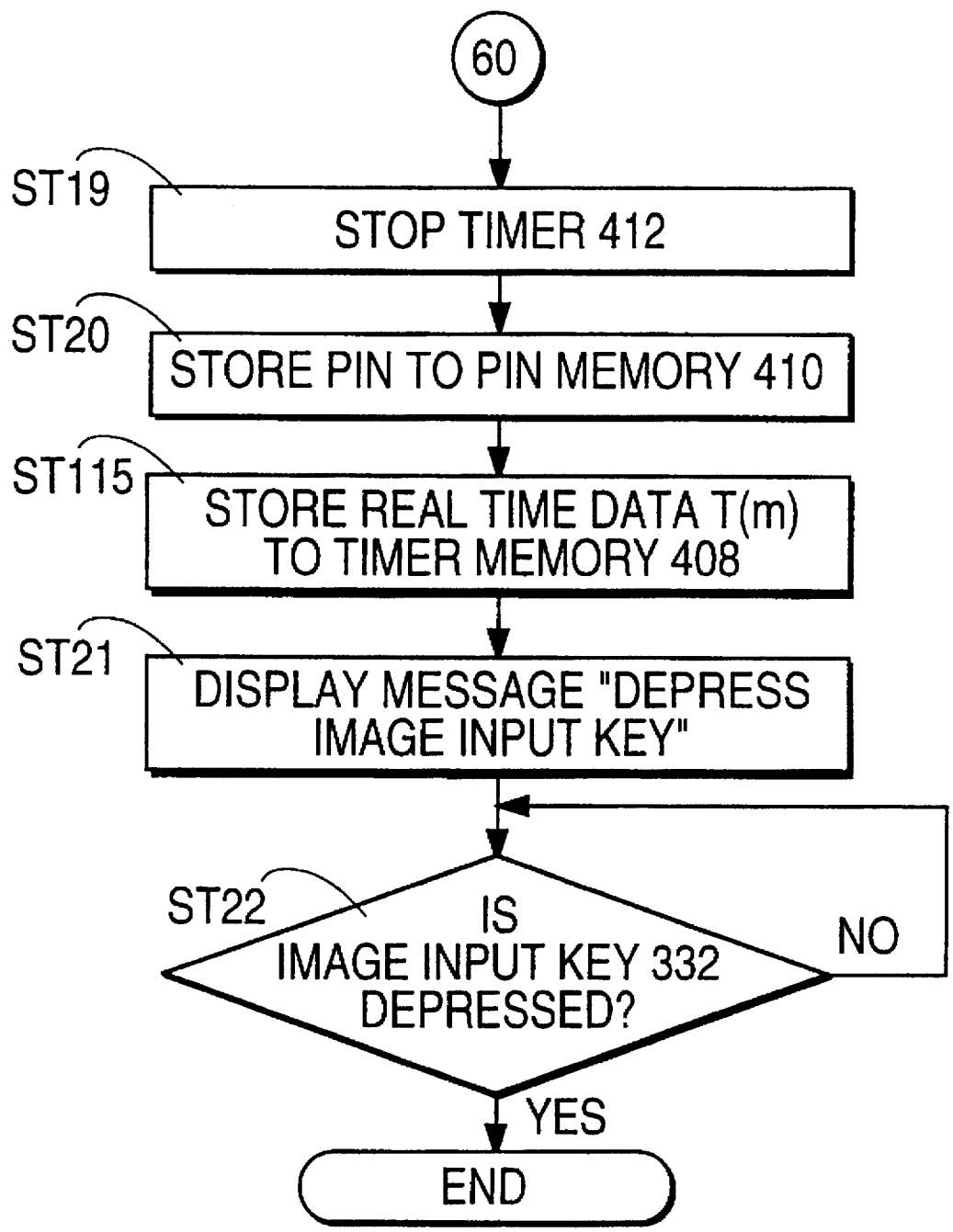

FIGS. 15(a) to 15(c) show a sixth embodiment in relation to an operation of the control system. In this embodiment, main CPU 400 temporarily stores an image data and a copying condition data to RAM 404 before storing them to image-data memory 406. If there is not enough area to store them in image-data memory 406, main CPU 400 deletes a stored image data and a stored copying condition data in sequence of input time until there is enough storage area in the image-data memory 406.

As shown in FIGS. 15(a) to 15(c), the start to step ST10, step ST12, step ST13 to step ST20, and step ST21 to the end of the flow are the same as that of the first embodiment. After the image-scanning operation at step ST10, main CPU 400 temporarily stores the image data and the copying condition data to RAM 404 (step ST110). After that, main CPU 400 transfers the image data and copying condition data from RAM 404 to image-data memory 406 to check whether the image-data memory 406 overflows (steps ST111 and ST112). If the main CPU 400 determines that the image-data memory 406 overflows, then main CPU 400 searches the oldest image data on the basis of an input time data and eliminates or deletes the oldest image data and the copying condition data corresponding to the oldest image data (step ST113). At this time, main CPU 400 makes the image-forming portion 4 output a copy image corresponding to the image data eliminated provided the "NO" confidential status data was input in step ST114 as described below. Then, the flow returns to step ST111. On the other hand, if main CPU 400 determines at step ST112 that image-data memory 406 does not overflow, then the flow advances to step ST12.

After step ST12, main CPU 400 causes display section 328 to display a message "CONFIDENTIAL DATA - - - YES/NO?" (step ST114). If the "NO" confidential status data was input by the NO key, the copy image is output in step ST113 when the image data is eliminated. On the contrary, if the "YES" confidential status data was input by the YES key, the copy image is not output in step ST113.

After step ST20, main CPU 400 stores a real time data T(m) which represents the real time, to timer memory 408 (step ST115). The real time data T(m) is used in step ST113 as the input time data. Then, the flow advances to step ST21.

The present invention may be embodied in other specific forms without departing from the spirit or essential characteristics thereof. The presently described embodiments are therefore to be considered in all respects as illustrative and not restrictive. The scope of the present invention is indicated by the appended claims rather than by the foregoing description, and all changes which come within the meaning and range of equivalency of the claims are therefore intended to be embraced therein.

What is claimed is:

1. An image-forming apparatus for forming an image on an image-bearing member, comprising:

an image-reading unit, the image-reading unit having an electric component which converts an original image to an image data;

a data memory in which the image data is stored;

an image-forming unit, the image-forming unit having an electric component which forms an image on the image-bearing member on the basis of the image data;

a data input device, the data input device having an electric component which generates a personal identification data in accordance with an operation of an operator;

first setting means for setting an image input mode when the image-reading unit is available and the image-forming unit is not available;

second setting means for setting an image output mode when the image-forming unit is available;

third setting means for setting a copy mode when both the image-reading unit and the image-forming unit are available; and means for controlling the image-reading unit, the data memory, and the image-forming unit such that the data memory stores the image data converted by the image-reading unit and correlated identification data in the image input mode, such that the image-forming unit forms an image on the basis of the image data corresponding to the identification data when the identification data is input again in the image output mode, and such that the image-reading unit converts an original image to image data and the image-forming unit sequentially forms an image on the basis of said image data in the copy mode.

2. An image-forming apparatus according to claim 1, further comprising means for identifying at least one of the image data stored in the data memory by inputting of the identification data, and means for individually deleting the image data identified by the identifying means from the data memory before the image-forming unit forms an image in the image output mode.

3. An image-forming apparatus according to claim 2, wherein the deleting means includes time data inputting means for inputting a time data at which said deletion occurs.

4. An image-forming apparatus according to claim 2, wherein the deleting means includes means for detecting that the data memory is full of the image data, and means for prohibiting input of additional image data.

5. An image-forming apparatus according to claim 2, wherein the deleting means includes means for detecting that the data memory is full of the image data, and means for searching the oldest image data so that the oldest image data is deleted to make room for additional image data.

6. An image-forming apparatus according to claim 1, wherein the data input device includes a control panel.

7. An image-forming apparatus according to claim 1, wherein the data input device includes an ID card reader/writer.

8. A copying machine for making copies by forming an image on an image-bearing member, comprising:

an image-reading unit, the image-reading unit having an electric component which converts an original image to image data;

a data memory in which the image data is stored;

an image-forming unit, the image-forming unit having an electric component which forms an image on the image-bearing member on the basis of the image data;

means for selecting at least one of a plurality of copying conditions;

a data input device, the data input device having an electric component which generates a personal identification data in accordance with an operation of an operator; and means for controlling the data memory such that the data memory stores the selected copying condition and correlated image data, and controlling the image-forming unit so as to form an image on the basis of the image data and the selected copying condition corresponding to the identification data when the same identification data is provided again to said copying machine.

9. An image-forming apparatus for forming an image on an image-bearing member, comprising:

an image-reading unit, the image-reading unit having an electric component which converts an original image to an image data;

a data memory in which the image data is stored;

an image-forming unit, the image-forming unit having an electric component which forms an image on the image-bearing member on the basis of the image data;

a data input device, the data input device having an electric component which generates output time data in accordance with an operation of an operator;

first setting means for setting an image input mode when the image-reading unit is available and the image-forming unit is not available;

second setting means for setting an image output mode when the image-forming unit is available;

third setting means for setting a copy mode when both the image-reading unit and the image-forming unit are available; and means for controlling the data memory such that the data memory stores the image data converted by the image-reading unit and correlated output time data in the image input mode, such that the image-forming unit forms an image on the basis of the image data and at a time equal to or greater than a time specified by the output time data in the image output mode, and such that the image-reading unit converts an original image to image data and the image-forming unit sequentially forms an image on the basis of said image data in the copy mode.

10. An image-forming apparatus according to claim 9, wherein the data input device includes a control panel.

11. An image-forming apparatus according to claim 9, wherein the data input device includes an ID card reader/writer.

12. An image-forming apparatus according to claim 9, further comprising means for deleting the image data from the data memory.

13. An image-forming apparatus according to claim 12, wherein the deleting means is operative for eliminating the image data after outputting same.

14. A copying machine for making copies by forming an image on an image-bearing member, comprising:
an image-reading unit, the image-reading unit having an electric component which converts an original image to an image data;
a data memory in which the image data is stored;
an image-forming unit, the image-forming unit having an electric component which forms an image on the image-bearing member on the basis of the image data;
means for selecting at least one of a plurality of copying conditions;
a data input device, the data input device having an electric component which generates output time data in accordance with an operation of an operator; and
means for controlling the data memory such that the data memory stores the selected copying condition and correlated image data, and controlling the image-forming unit so as to form an image on the basis of the image data and the selected copying condition and at a time equal to or greater than a time specified by the output time data and to output said image-bearing member from said copying machine.

15. A copying system for making copies, comprising:
a first copying machine;
a second copying machine; and
a communications line for coupling the first copying machine to the second copying machine;
the first copying machine having
an image-reading unit, the image-reading unit having an electric component which converts an original image to an image data,
a data memory in which the image data is stored,
a first data input device, the first data input device having an electric component which generates an identification data, the identification data being different for every operation of an operator, and
first control means for controlling the data memory such that a correspondence is found between the image data and the identification data,
the second copying machine having
an image-forming unit, the image-forming unit having an electric component which forms an image on an image-bearing member on the basis of an image data,
a second data input device, the second data input device having an electric component which generates an identification data in accordance with an operation of an operator, and
second control means for controlling the image-forming unit so as to form an image on the basis of the image data stored in the data memory of the first copying machine, corresponding to the identification data when the same identification data is again provided to said copying system.

16. An image-forming apparatus for forming an image on an image-bearing member, comprising:
means for reading an original image to make an image data;
means for storing the image data in correspondence with an identification data;
means for forming an image on the image-bearing member on the basis of the image data;
means for driving the reading means and the forming means so as to be independent of each other;
first setting means for setting an image input mode when the reading means is available and the forming means is not available;
second setting means for setting an image output mode when the forming means is available;
third setting means for setting a copy mode when both the reading means and the forming means are available;
means for inputting a personal identification data; and
means for controlling the storing means such that a correspondence is found between the image data and the identification data when the reading means operates in the image input mode, controlling the forming means so as to form an image on the basis of the image data corresponding to the identification data when the identification data is inputted again in the image output mode, and controlling the reading means and the forming means such that the reading means generates image data and the forming means forms an image on the basis of said image data in the copy mode.

17. An image-forming apparatus according to claim 16, further comprising means for identifying at least one of the image data stored in the storing means by inputting of the identification data, and means for individually deleting the image data identified by the identifying means from the storing means before the forming means forms an image in the image output mode.

18. An image-forming apparatus according to claim 17, wherein the deleting means includes time data inputting means for inputting a time data at which said deletion occurs.

19. An image-forming apparatus according to claim 17, wherein the deleting means includes means for detecting that the data memory is full of the image data, and means for prohibiting input of additional image data.

20. An image-forming apparatus according to claim 17, wherein the deleting means includes means for detecting that the data memory is full of the image data, and means for searching the oldest image data so that the oldest image data is deleted to make room for additional image data.

21. An image-forming apparatus according to claim 17, wherein the deleting means includes means for setting an image data clear mode so that the image data is deleted when the corresponding identification data is input in the image data clear mode.

22. A copying machine for making copies by forming an image on an image-bearing member, comprising:
means for reading an original image to make an image data;

means for storing the image data in correspondence with a personal identification data;

means for forming an image on the image-bearing member on the basis of the image data;

means for selecting at least one of a plurality of copying conditions;

means for driving the reading means and the forming means according to the selected copying condition so as to be independent of each other;

first setting means for setting an image input mode when the reading means is available and the forming means is not available;

second setting means for setting an image output mode when the forming means is available;

means for inputting an identification data; and means for controlling the storing means such that the storing means stores the selected copying condition and correlated image data, and controlling the forming means so as to form an image on the basis of the image data corresponding to the identification data when the identification data is inputted to said copying machine in the image output mode.

23. An image-forming apparatus for forming an image on an image-bearing member, comprising:

an image-reading unit, the image-reading unit having an electric component which converts an original image to an image data;

a data memory in which the image data is stored;

an image-forming unit, the image-forming unit having an electric component which forms an image on the image-bearing member on the basis of the image data;

first setting means for setting an image input mode when the image-reading unit is available and the image-forming unit is not available;

second setting means for setting a copy mode when both the image-reading unit and the image-forming unit are available; and means for controlling the data memory such that the data memory stores the image data converted by the image-reading unit in the image input mode, controlling the image-forming unit so as to form an image on the basis of the image data at a predetermined timing which an operator requests, and controlling the image-reading unit and the image-forming unit such that the image-reading unit converts an original image to image data and the image-forming unit sequentially forms an image on the basis of said image data in the copy mode.

24. An image-forming apparatus according to claim 23, wherein the controlling means includes a data input device for inputting a data which indicates the predetermined timing.

25. An image-forming apparatus according to claim 24, wherein the data input device includes keys for inputting a personal identification number.

26. An image-forming apparatus according to claim 24, wherein the data input device includes keys for inputting a data of an output time at which the image-forming device forms an image.

27. An image-forming apparatus according to claim 24, wherein the data input device includes an ID card reader/writer for receiving an ID card which an operator provides.

28. A method of enhancing efficiency of operation of an image-forming apparatus having an image-scanning unit and an image-forming unit, comprising the steps of:

when said image-scanning unit is available and said image-forming unit is not available,
  (a) scanning an original document with said image-scanning unit to produce image data,
  (b) entering personal identification data, and
  (c) storing said image data in correspondence with said identification data;

when said image-forming unit is available,
  (d) entering said identification data again,
  (e) retrieving said stored image data corresponding to said entered identification data, and
  (f) operating said image-forming unit to produce a copy of said original document; and when both said image-scanning unit and said image-forming unit are available,
  (g) scanning an original document with said image-scanning unit to generate image data, and
  (h) operating said image-forming unit to produce a copy of said original document.

29. A method of enhancing efficiency of operation of an image-forming apparatus having an image-scanning unit and an image-forming unit, comprising the steps of:

when said image-scanning unit is available and said image-forming unit is not available,
  (a) scanning an original document with said image-scanning unit to produce image data,
  (b) entering time data, and
  (c) storing said image data in correspondence with said time data; and when said image-forming unit is available,
  (d) retrieving said stored image data corresponding to said entered time data when the actual time is equal to or greater than the time represented by said entered time data, and then,
  (e) operating said image-forming unit to produce a copy of said original document; and when both said image-scanning unit and said image-forming unit are available,
  (f) scanning an original document with said image-scanning unit to generate image data, and
  (g) operating said image-forming unit to produce a copy of said original document.

30. A copying machine for making copies by forming an image on an image-bearing member, comprising:
  (a) an optical image-scanning device generating image data corresponding to an original document;
  (b) an input device for inputting personal identification data, the identification data being different for every operation of an operator;
  (c) a memory for storing said image data in correspondence with said identification data, and
  (d) an image-forming unit for forming an image on said image-bearing member in accordance with said image data and in response to a second inputting of said identification data to said copying machine.

* * * * *